United States Patent
Qiu et al.

(10) Patent No.: US 12,441,759 B2
(45) Date of Patent: Oct. 14, 2025

(54) METHOD FOR SYNTHESIZING URSODEOXYCHOLIC ACID USING BA AS RAW MATERIAL

(71) Applicant: JIANGSU JIAERKE PHARMACEUTICALS GROUP CORP., LTD., Jiangsu (CN)

(72) Inventors: Wenwei Qiu, Shanghai (CN); Jie Wang, Shanghai (CN)

(73) Assignee: JIANGSU JIAERKE PHARMACEUTICALS GROUP CORP., LTD., Jiangsu (CN)

( * ) Notice: Subject to any disclaimer, the term of this patent is extended or adjusted under 35 U.S.C. 154(b) by 748 days.

(21) Appl. No.: 17/781,095

(22) PCT Filed: Nov. 6, 2020

(86) PCT No.: PCT/CN2020/126922
§ 371 (c)(1),
(2) Date: May 31, 2022

(87) PCT Pub. No.: WO2021/109791
PCT Pub. Date: Jun. 10, 2021

(65) Prior Publication Data
US 2023/0039886 A1 Feb. 9, 2023

(30) Foreign Application Priority Data
Dec. 3, 2019 (CN) .................. 201911222943.8

(51) Int. Cl.
*C07J 9/00* (2006.01)
*C07J 21/00* (2006.01)

(52) U.S. Cl.
CPC .............. *C07J 9/005* (2013.01); *C07J 9/00* (2013.01); *C07J 21/006* (2013.01)

(58) Field of Classification Search
CPC ............ C07J 9/005; C07J 21/006; C07J 9/00
See application file for complete search history.

(56) References Cited

FOREIGN PATENT DOCUMENTS

| CN | 105503987 A | 4/2016 |
| CN | 111072744 A | 4/2020 |
| WO | 2014020024 A1 | 2/2014 |

OTHER PUBLICATIONS

International Search Report and Written Opinion mailed Feb. 5, 2021 in International Application PCT/CN2020/126922.
Wang et al. "Synthesis of ursodeoxycholic acid from plant-source (20S)-21-hydroxy-20-methylpregn-4-en-3-one", Steroids, Feb. 14, 2020, pp. 1-6., vol. 157.
Samaja et al. "27-Nor-Δ4-dafachronic acid is a synthetic ligand of Caenorhabditis elegans DAF-12 receptor" Bioorganic & Medicinal Chemistry Letters, Mar. 28, 2013, pp. 2893-2896,vol. 23.
Zhou et al., "Stereocontrolled Conversion of Hyodeoxycholic Acid into Chenodeoxycholic Acid and Ursodeoxycholic Acid", Journal of the Chemical Society Perkin Transactions, 1990, pp. 1-3.
Dou et al., "A Facile Route to Ursodeoxycholic Acid Based on Stereocontrolled Conversion and Aggregation Behavior Research", Synthesis, 2016, pp. 588-594.
Dangate et al., "Regioselective oxidation of cholic acid and its 7b epimer by using o-iodoxybenzoic acid", Steroids, 2011, pp. 1397-1399, vol. 76.
Yu et al., "Novel FXR (farnesoid X receptor) modulators: Potential therapies for cholesterol gallstone disease", Bioorganic & Medicinal Chemistry, 2016, pp. 3986-3993, vol. 24.

*Primary Examiner* — Susanna Moore
(74) *Attorney, Agent, or Firm* — Venable LLP

(57) ABSTRACT

The present invention discloses a synthesis method of ursodeoxycholic acid by using the plant-derived compound BA as a raw material to synthesize ursodeoxycholic acid through the steps of ethylene glycol or neopentyl glycol protection, oxidation, Wittig reaction, deprotection, reduction and hydrolysis, etc. The raw materials used for the synthesis of ursodeoxycholic acid in the present invention are cheap and easy to get, the synthesis steps are easy to operate, the yield is high, the reaction is environmentally friendly, and the industrial production is convenient.

17 Claims, 2 Drawing Sheets

METHOD FOR SYNTHESIZING URSODEOXYCHOLIC ACID USING BA AS RAW MATERIAL

CROSS REFERENCE TO RELATED APPLICATIONS

This application is a national stage application, filed under 35 U.S.C. § 371, of International Application No. PCT/CN2020/126922, filed Nov. 6, 2020, which is incorporated by reference herein in its entirety. PCT/CN2020/126922 claims priority to Chinese Application 201911222943.8, filed Dec. 3, 2019.

TECHNICAL FIELD

The present invention belongs to the technical field of organic chemical synthesis/drug synthesis, relates to a method for synthesizing ursodeoxycholic acid, specifically to a method for synthesizing ursodeoxycholic acid with 21-hydroxy-20-methylpregna-4-en-3-one (BA) as a raw material.

BACKGROUND OF THE INVENTION

Ursodeoxycholic acid (UDCA) (as shown in formula 1), chemical name 3α,7β-dihydroxy-5β-cholan-24-oic acid, CAS No. 128-13-2, molecular formula $C_{24}H_{40}O_4$, molecular weight is 392.56, white powder, odorless, bitter taste, melting point is 203-204° C. Ursodeoxycholic acid is the main component contained in the bear bile which is one precious traditional Chinese medicine. It is the first-line treatment drug for primary biliary cirrhosis (PBC) approved by US FDA. It can also effectively treat gallstone disease and chronic liver disease in clinical practice and have broad market prospects.

At present, the preparation of ursodeoxycholic acid mainly includes two methods: animal bile extraction and artificial synthesis. However, it mainly relies on artificial synthesis as the source of animal bile extraction is limited and difficult to meet the medical needs.

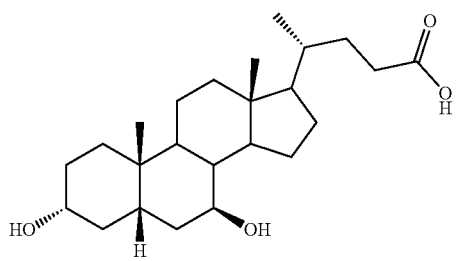 [SMILES: C[C@H](CCC(=O)O)C1CCC2C3C(CC[C@@]21C)[C@@]1(C)CC[C@@H](O)C[C@H]1C[C@@H]3O]

Formula 1 Structural Formula of Ursodeoxycholic Acid

The reports of ursodeoxycholic acid synthesis mainly include the following methods: (1) Ursodeoxycholic acid is synthesized through a 7-step reaction using hyodeoxycholic acid as a raw material, with a total yield of 15% (as shown in Scheme 1, *Journal of the Chemical Society Perkin Transactions*, 1990, 1: 1-3.). The raw materials used in this route are cheap and readily available, but the steps are complicated and the yield is low. At the same time, the last step of the reaction adopts lithium-liquid ammonia reduction which is dangerous.

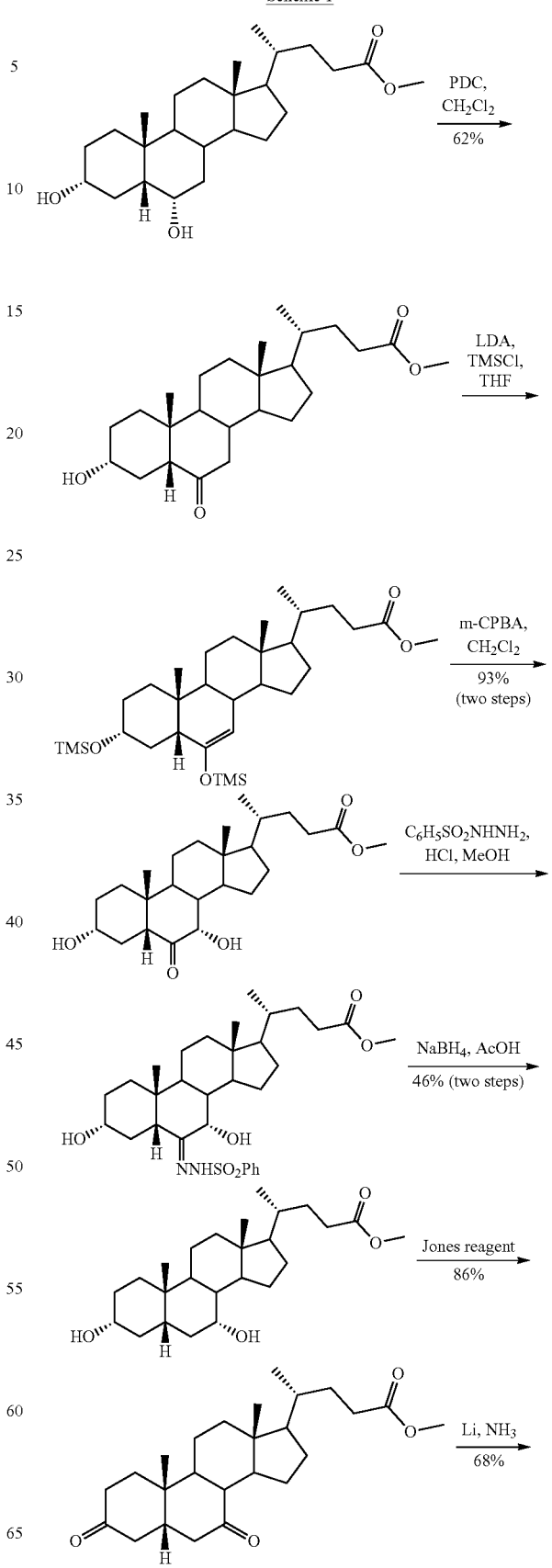

Scheme 1

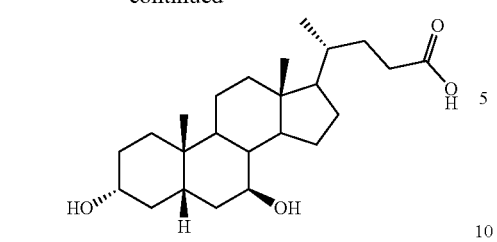
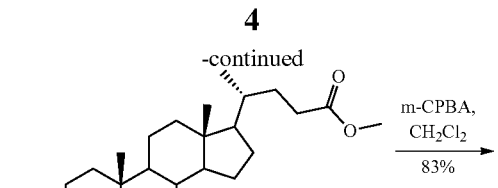

(2) Ursodeoxycholic acid is synthesized with a total yield of 16% through a 9-step reaction using hyodeoxycholic acid as a raw material (as shown in Scheme 2, *Synthesis*, 2016, 48: 588-594.). The raw materials used in this route are cheap and readily available, but the processes are too complicated and the yield is low. Similarly, metal sodium is used in the reduction, so the reaction is violent and dangerous.

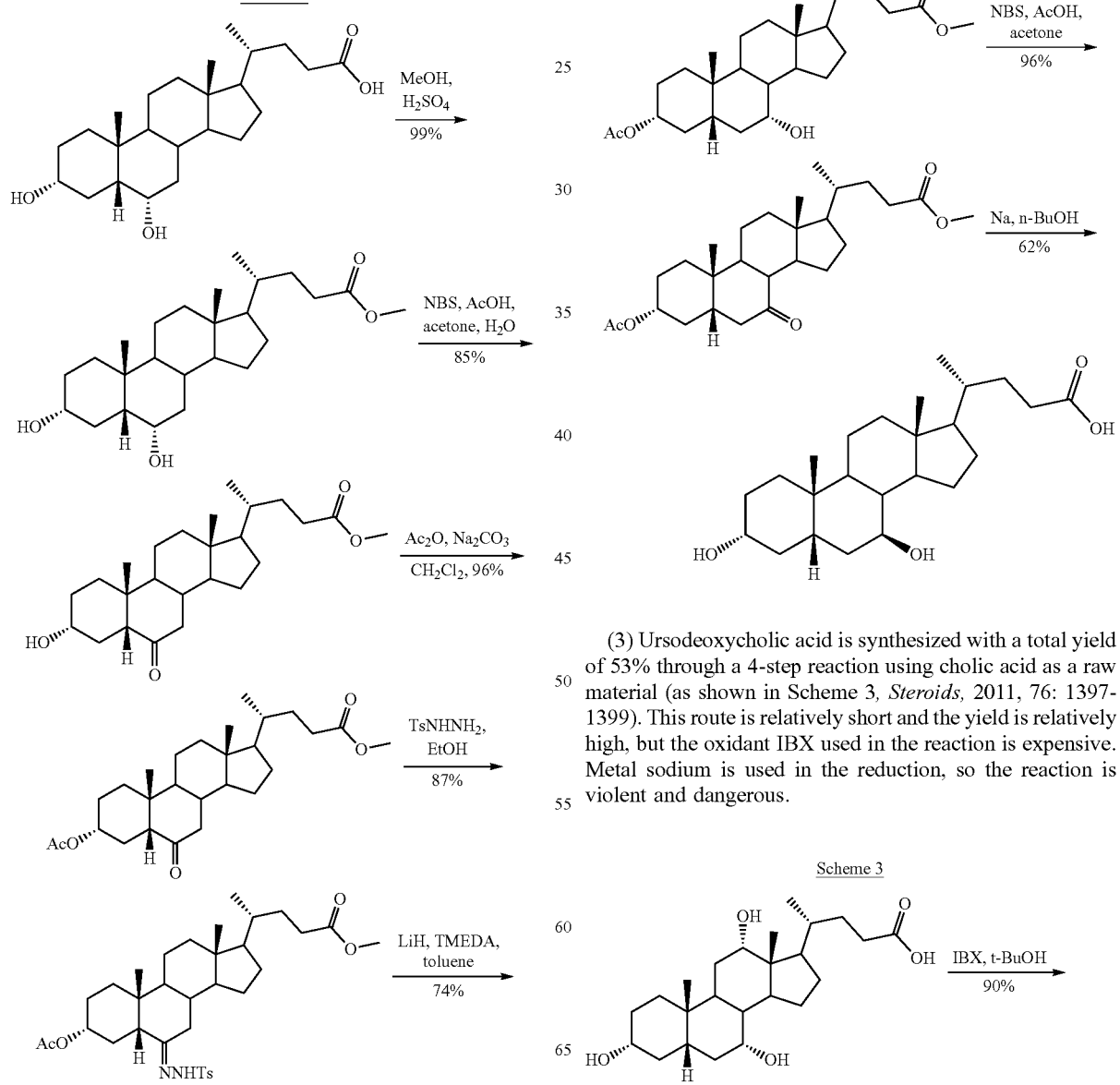

(3) Ursodeoxycholic acid is synthesized with a total yield of 53% through a 4-step reaction using cholic acid as a raw material (as shown in Scheme 3, *Steroids*, 2011, 76: 1397-1399). This route is relatively short and the yield is relatively high, but the oxidant IBX used in the reaction is expensive. Metal sodium is used in the reduction, so the reaction is violent and dangerous.

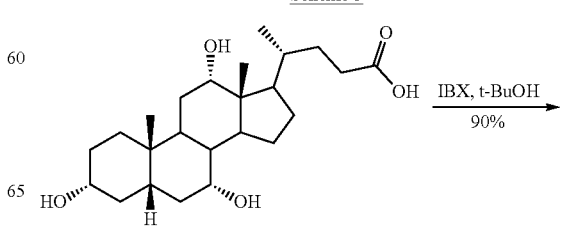

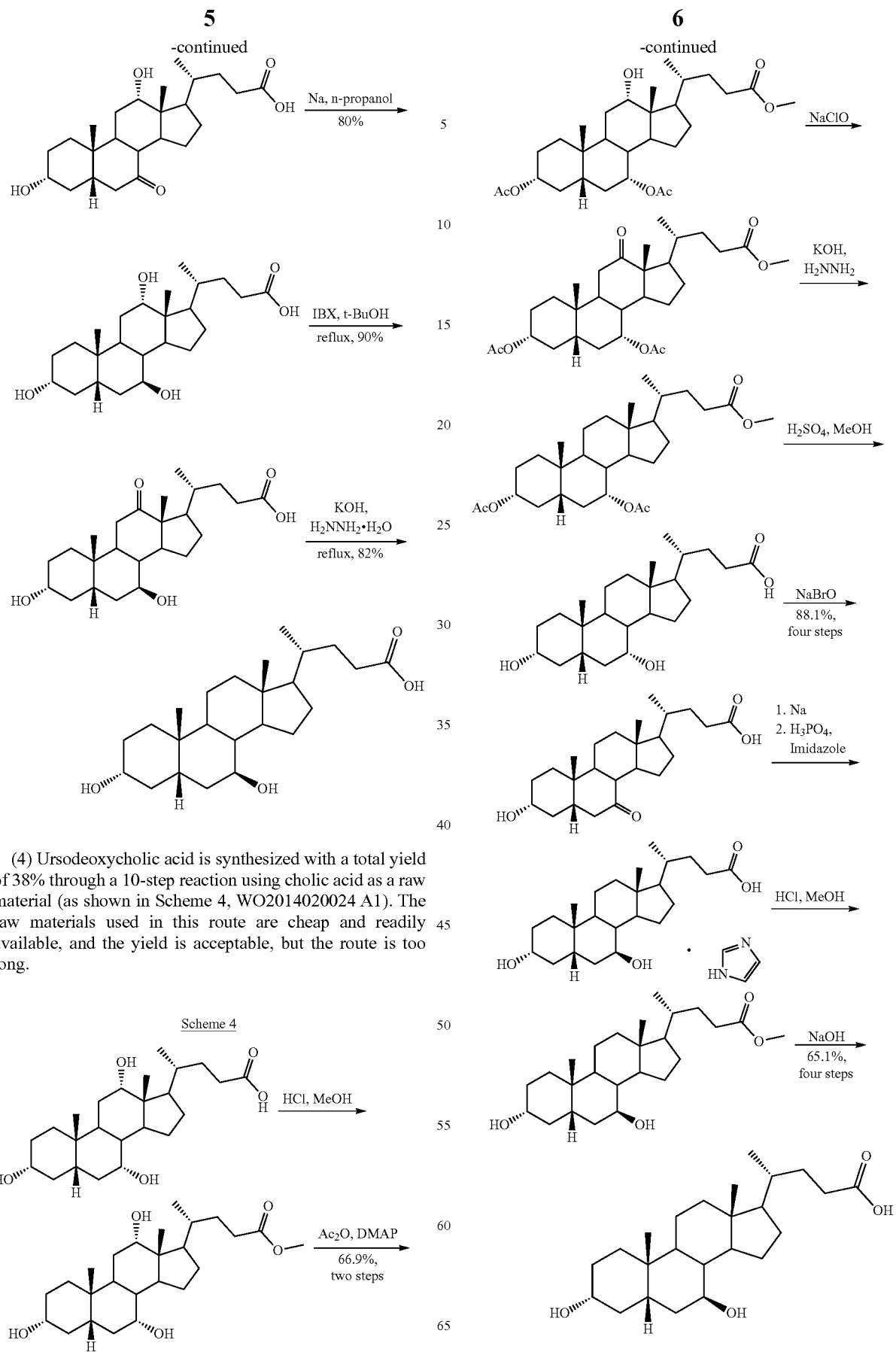
(4) Ursodeoxycholic acid is synthesized with a total yield of 38% through a 10-step reaction using cholic acid as a raw material (as shown in Scheme 4, WO2014020024 A1). The raw materials used in this route are cheap and readily available, and the yield is acceptable, but the route is too long.
Scheme 4

(5) Ursodeoxycholic acid is synthesized with a total yield of 53% through a four-step reaction using chenodeoxycholic acid as a raw material (as shown in Scheme 5, CN105503987 A). This route is short and the yield is acceptable, but the selectivity of hydrogen reduction is poor.

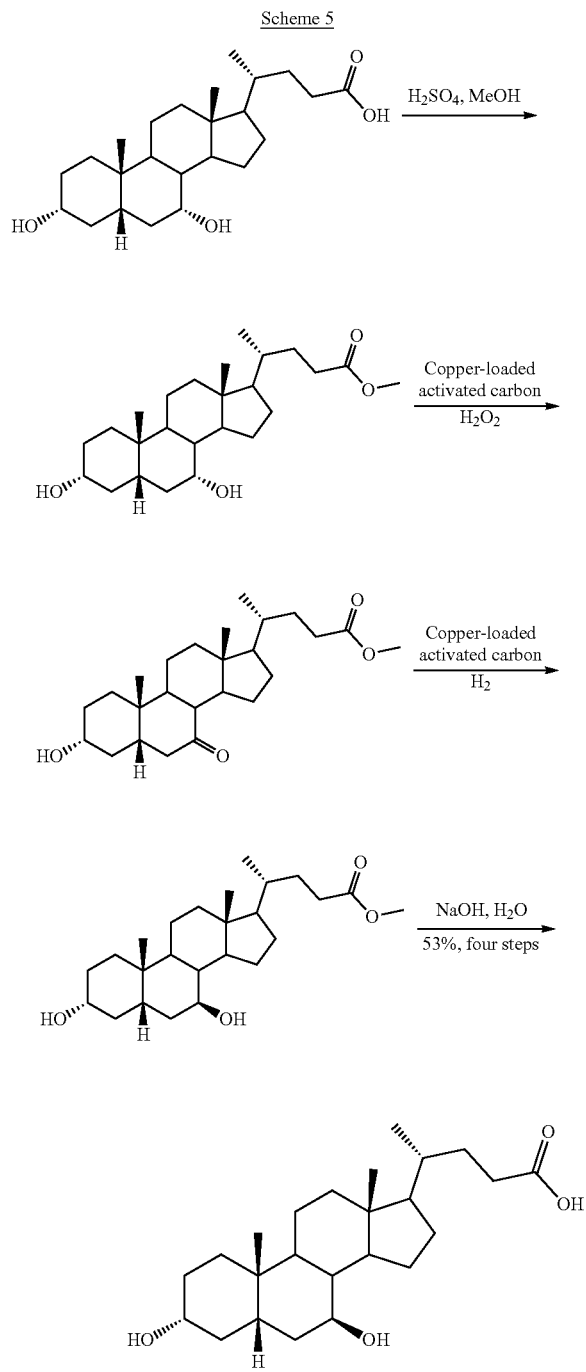

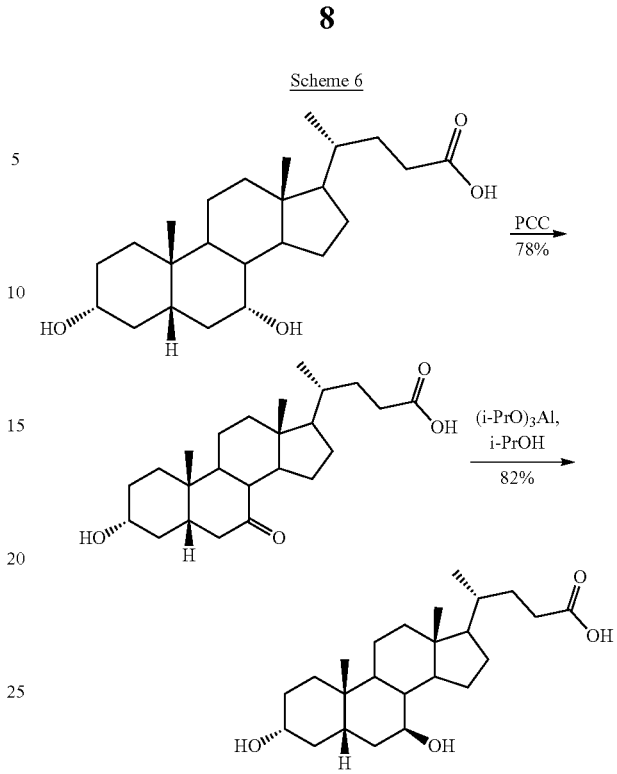

(6) Ursodeoxycholic acid is synthesized with a total yield of 64% through a two-step reaction using chenodeoxycholic acid as a raw material (as shown in Scheme 6, *Bioorganic & Medicinal Chemistry*, 2016, 24: 3986-3993). This route is short and the yield is relatively high, but the raw material chenodeoxycholic acid is expensive.

The synthesis route of ursodeoxycholic acid that has been reported at present not only has the defects such as too complicated steps, low yield, heavy pollution and expensive raw materials, but also the existing synthesis routes of ursodeoxycholic acid reported above are all based on animal cholic acids (bovine, sheep cholic acid, chenodeoxycholic acid, ursolic acid, porcine cholic acid, hyodeoxycholic acid) as starting raw material, but due to the emergence of diseases such as avian influenza, mad cow disease, suis streptococcosis and African swine fever, people have doubts about the safety of animal-derived raw materials. Therefore, it is of great significance and industrial value to develop an efficient synthesis method of ursodeoxycholic acid based on plant-derived raw material.

SUMMARY OF THE INVENTION

The present invention overcomes the defects of the prior arts, and uses (20S)-21-hydroxy-20-methylpregn-4-en-3-one, also known as BA (bisnoralcohol), as a raw material (which is obtained from phytosterol through biological fermentation). Ursodeoxycholic acid is synthesized through steps include ethylene glycol or neopentyl glycol protection, oxidation, Wittig reaction, deprotection, reduction and hydrolysis, etc. The present invention provides an efficient and simple method for chemically synthesizing ursodeoxycholic acid which has the advantages of cheap and readily available raw materials, mild reaction conditions, convenient post-processing, environment-friendly, low cost, high yield and convenient industrial production.

The raw material (20S)-21-hydroxy-20-methylpregn-4-en-3-one used in the present invention, also called BA (bisnoralcohol), is derived from the fermentation of phytosterols which are leftovers from the oil process. It is a green raw material of plant origin. The current annual output of BA is 1,000 tons and its price is cheap, which well avoids the infection of pathogenic bacteria and viruses in the prior art. The synthetic route of the present invention has the advantages of simple and convenient synthetic steps, high yield, environment-friendly and convenient for industrialized production.

In the synthesis method of the present invention, the said (20S)-21-hydroxy-20-methylpregn-4-en-3-one (BA) as a raw material includes but is not limited to being obtained from phytosterol through biological fermentation, or obtained by a chemical synthesis method.

The present invention provides a method for synthesizing ursodeoxycholic acid with (20S)-21-hydroxy-20-methylpregn-4-en-3-one (BA) as a raw material comprising the following steps:

(a) In the first solvent, the BA show in formula (1) is protected by ethylene glycol to obtain the compound of the formula (2);

(b) In the second solvent, the compound of formula (2) is oxidized to obtain the compound of formula (3);

(c) In the third solvent, the compound of formula (3) undergoes Wittig reaction to obtain the compound of formula (6);

(d) In the fourth solvent, the compound of formula (6) undergoes oxidation reaction to obtain the compound of formula (7);

(e) In the fifth solvent, the compound of formula (7) undergoes hydrolysis reaction under the action of acid and deprotection of ethylene glycol, to obtain the compound of formula (8);

(f) In the sixth solvent, under the action of catalyst and hydrogen under pressure, the compound of formula (8) is heated with alkali and subjected to reduction and hydrolysis reaction, to obtain the said ursodeoxycholic acid which has the structure shown in the formula (9);

Or, the present invention provides a method for synthesizing ursodeoxycholic acid with (20S)-21-hydroxy-20-methylpregn-4-en-3-one (BA) as a raw material further comprises the following steps:

Wherein, the said compound of formula (6) can also be obtained through the following steps;

(g) In the seventh solvent, the BA shown in the formula (1) undergoes oxidation reaction to obtain the compound of the formula (4);

(h) In the eighth solvent, the compound of formula (4) undergoes Wittig reaction to obtain the compound of formula (5);

(i) In the ninth solvent, the compound of formula (5) is protected by ethylene glycol or neopentyl glycol to obtain the compound of formula (6);

(d) In the fourth solvent, the compound of formula (6) undergoes oxidation reaction to obtain the compound of formula (7);

(e) In the fifth solvent, the compound of formula (7) undergoes hydrolysis reaction under the action of acid and deprotection of ethylene glycol or neopentyl glycol, to obtain the compound of formula (8);

(f) In the sixth solvent, under the action of catalyst and hydrogen under pressure, the compound of formula (8) is heated with alkali and subjected to reduction and hydrolysis reaction, to obtain the ursodeoxycholic acid which has the structure as shown in formula (9); The reaction process is shown in Route (A):

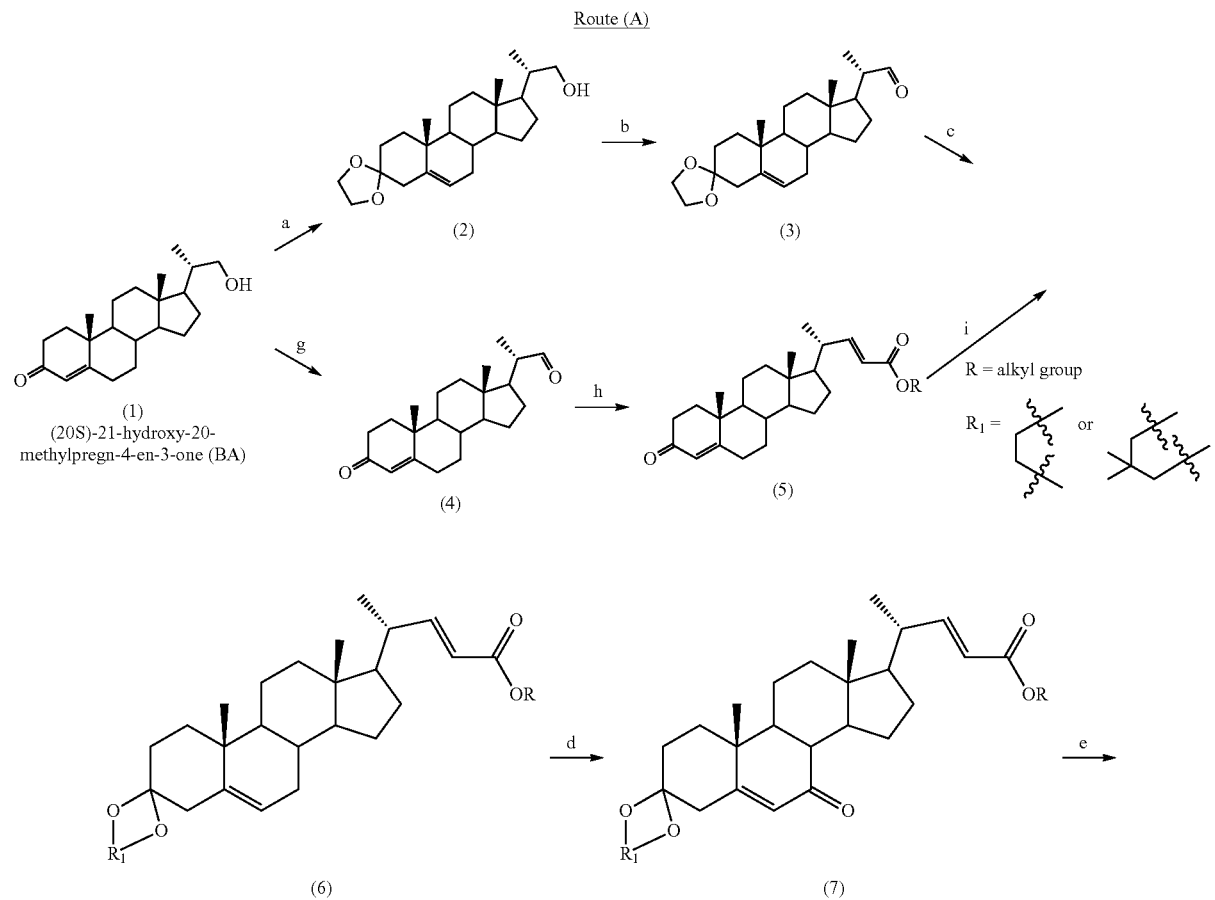

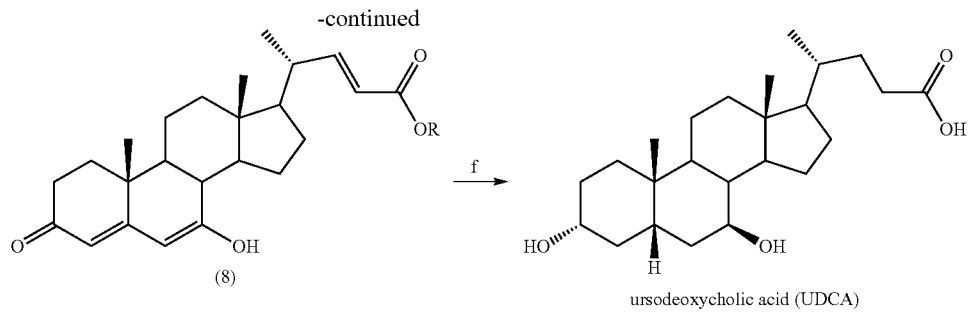

Wherein, R is an alkyl group; preferably, is a C1~C20 alkyl group; more preferably, is a C1, C2 alkyl group.

R₁ is

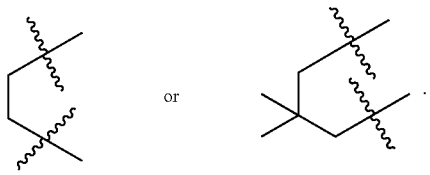

In step (a), the said ethylene glycol protection reaction refers to: BA shown in formula (1), ethylene glycol and p-toluenesulfonic acid are dissolved in the first solvent and subjected to ethylene glycol protection reaction, to obtain the compound of formula (2); or, BA shown in formula (1), ethylene glycol, p-toluenesulfonic acid and triethyl orthoformate are dissolved in the first solvent and subjected to ethylene glycol protection reaction; preferably, BA shown in formula (1), ethylene glycol and p-toluenesulfonic acid are dissolved in the first solvent and subjected to ethylene glycol protection reaction, to obtain the compound of formula (2).

In step (a), the said first solvent is selected from one or more of benzene, toluene, ethyl acetate, tetrahydrofuran, hexane, etc.; preferably, is benzene.

When the said ethylene glycol protection reaction in step (a) refers to: BA shown in formula (1), ethylene glycol and p-toluenesulfonic acid are dissolved in the first solvent and subjected to the ethylene glycol protection reaction, to obtain the compound of formula (2), wherein, the molar ratio of BA shown in formula (1), ethylene glycol and p-toluenesulfonic acid is 1:(1-50):(0.01-1), preferably, is 1:10:0.01; the said ethylene glycol protection reaction temperature is 80~130° C., preferably, is 90° C.; the said ethylene glycol protection reaction time is 2~36 h, preferably, is 24 h.

When the said ethylene glycol protection reaction in step (a) is: BA shown in formula (1), ethylene glycol, p-toluenesulfonic acid and triethyl orthoformate are dissolved in the first solvent and subjected to ethylene glycol protection reaction, to obtain the compound of formula (2); wherein, the molar ratio of BA shown in formula (1), ethylene glycol, p-toluenesulfonic acid and triethyl orthoformate is 1:(1-50):(0.01-1):(1-20); preferably, is 1:10:0.1:3; the said ethylene glycol protection reaction temperature is 0~50° C., preferably, is room temperature 25° C.; the said ethylene glycol protection reaction time is 2~36 h, preferably, is 8 h.

In a specific embodiment, the synthesis steps of the compound of formula (2) include: BA shown in formula (1) is dissolved in the first solvent, reacted with ethylene glycol and p-toluenesulfonic acid which protects 3-carbonyl group of BA shown in formula (1), to obtain the compound of formula (2).

In step (b), the said oxidation reaction refers to: the compound of formula (2), TEMPO, sodium bicarbonate, tetrabutylammonium bromide and an oxidant are dissolved in the second solvent and subjected to an oxidation reaction, to obtain the compound of formula (3).

In step (b), the said oxidant is selected from one or more of N-chlorosuccinimide (NCS), N-bromosuccinimide (NBS), 2-iodoylbenzoic acid (IBX), etc.; preferably, is N-chlorosuccinimide (NCS).

In step (b), the molar ratio of the compound of formula (2), TEMPO, sodium bicarbonate, tetrabutylammonium bromide and the oxidant is 1:(0-1):(0-20):(0-1):(1-5); preferably, is 1:0.01:1.35:0.1:1.15.

In step (b), the said second solvent is selected from one or more of dichloromethane, tetrahydrofuran, toluene, dimethyl sulfoxide, water, etc.; preferably, is a mixed solvent of dichloromethane and water.

In step (b), the said oxidation reaction temperature is 0~30° C.; preferably, is 0° C.

In step (b), the said oxidation reaction time is 2~8 h; preferably, is 5 h.

In a specific embodiment, the synthesis steps of the compound of formula (3) include: the compound of formula (2) is dissolved in the second solvent, then added with TEMPO, sodium bicarbonate, tetrabutylammonium bromide and NCS and subjected to oxidation reaction, to obtain the compound of formula (3).

In step (c), the said Wittig reaction refers to: the compound of formula (3) and ethyl (triphenylphosphoranylidene)acetate are dissolved in the third solvent and subjected to Wittig reaction, to obtain the compound of formula (6).

Wherein, the molar ratio of the compound of formula (3) and ethyl (triphenylphosphoranylidene)acetate is 1:(1~5); preferably, is 1:2.

Wherein, the said third solvent is selected from one or more of benzene, toluene, ethyl acetate, tetrahydrofuran, hexane, etc.; preferably, is toluene.

Wherein, the said Wittig reaction temperature is 80~130° C.; preferably, is 110° C.

Wherein, the said Wittig reaction time is 2~8 h; preferably, is 4 h.

Or, in step (c), the said Wittig reaction refers to: the compound of formula (3), sodium hydride and triethyl phosphonoacetate are dissolved in the third solvent and subjected to Wittig reaction, to obtain the compound of formula (6).

Wherein, the molar ratio of the compound of formula (3), sodium hydride and triethyl phosphonoacetate is 1:(1~5):(1~5); preferably, is 1:1.5:1.5.

Wherein, the said third solvent is selected from one or more of benzene, toluene, ethyl acetate, tetrahydrofuran, hexane, etc.; preferably, is tetrahydrofuran.

Wherein, the said Wittig reaction temperature is 0~30° C.; preferably, is 0° C.

Wherein, the said Wittig reaction time is 2~8 h; preferably, is 4 h.

In a specific embodiment, the synthesis steps of the compound of formula (6) include: the compound of formula (3), ethyl (triphenylphosphoranylidene)acetate or the compound of formula (3), sodium hydride and triethyl phosphonoacetate are dissolved in the third solvent and subjected to Wittig reaction, to obtain the compound of formula (6).

In step (d), the said oxidation reaction refers to: the compound of formula (6), oxidant, N-hydroxyphthalimide (NHPI) and acetic acid are dissolved in the fourth solvent and subjected to oxidation reaction, to obtain the compound of formula (7).

In step (d), the said oxidant is selected from one or more of $Na_2Cr_2O_7$, $K_2Cr_2O_7$, PDC, BPO, etc.; preferably, is PDC.

In step (d), the molar ratio of the compound of formula (6), oxidant, N-hydroxyphthalimide (NHPI) and acetic acid is 1:(1-5):(1~5):(0~5); preferably, is 1:1.1:1.1:0.

In step (d), the said fourth solvent is selected from one or more of toluene, acetone, acetonitrile, water, dichloromethane, N,N-dimethylformamide, ethyl acetate, tert-butanol, N-methylpyrrolidone, etc.; preferably, is a mixed solvent of acetone and water; more preferably, is a mixed solvent of acetone:water (volume ratio)=9:1.

In step (d), the said oxidation reaction temperature is 0~50° C.; preferably, is room temperature 25° C.

In step (d), the said oxidation reaction time is 10~48 h; preferably, is 20 h.

In a specific embodiment, the synthesis steps of the compound of formula (7) include: the compound of formula (6) is dissolved in the fourth solvent, added with PDC and NHPI and subjected to oxidation reaction, to obtain the compound of formula (7).

In step (e), the said ethylene glycol deprotection reaction refers to: the compound of formula (7) and the acid are dissolved in the fifth solvent and subjected to ethylene glycol deprotection reaction, to obtain the compound of formula (8).

In step (e), the molar ratio of the compound of formula (7) and the acid is 1:(1-50); preferably 1:5.

In step (e), the fifth solvent is selected from one or more of tetrahydrofuran, ethyl acetate, methanol, dichloromethane, ether, water, toluene, acetone, etc.; preferably, is a mixed solvent of tetrahydrofuran and water; more preferably, is a mixed solvent of tetrahydrofuran:water (volume ratio)=9:1.

In step (e), the said acid is selected from one or more of concentrated sulfuric acid, concentrated hydrochloric acid, p-toluenesulfonic acid, etc.; preferably, is concentrated sulfuric acid.

In step (e), the said hydrolysis reaction temperature is 0~50° C.; preferably, is room temperature 25° C.

In step (e), the said hydrolysis reaction time is 1~10 h; preferably, is 4 h.

In a specific embodiment, the synthesis steps of the compound of formula (8) include: the compound of formula (7) is dissolved in the fifth solvent, added with concentrated sulfuric acid and subjected to hydrolysis reaction, to obtain the compound of formula (8).

In step (f), the molar ratio of the compound of formula (8) and the base is 1:(1~5); preferably, is 1:2.

In step (f), the mass ratio of the compound of formula (8) and Raney nickel is 1:(0.1~5); preferably, is 1:1.

In step (f), the said sixth solvent is selected from one or more of tetrahydrofuran, 2-methyltetrahydrofuran, isopropanol, tert-butanol, methanol, ethanol, etc.; preferably, is a mixed solvent of tetrahydrofuran and isopropanol; more preferably, is a mixed solvent of tetrahydrofuran:isopropanol (volume ratio)=1:1.

In step (f), the said base is selected from one or more of sodium tert-butoxide, potassium tert-butoxide, sodium ethoxide, sodium methoxide, sodium hydroxide, potassium hydroxide, etc.; preferably, is sodium tert-butanol.

In step (f), the said catalyst is selected from one or more of Raney nickel, etc. Preferably, is Raney nickel.

In step (f), the said hydrolysis and reduction reaction temperature is 20~100° C.; preferably, is 90° C.

In step (f), the said hydrolysis and reduction reaction time is 24~72 h; preferably, is 48 h.

In step (f), the said reaction is carried out under the condition of hydrogen pressurization, and the said pressure range of the hydrogen is 0.1~10 MPa; preferably, is 4.0 MPa.

In a specific embodiment, the synthesis steps of the compound of formula (9) include: the compound of formula (8) is dissolved in the sixth solvent, added in sequence with Raney nickel and sodium tert-butoxide, and reacted to obtain the compound of ursodeoxycholic acid shown in formula (9).

In step (g), the said oxidation reaction refers to: BA shown in formula (1), TEMPO, sodium bicarbonate, tetrabutylammonium bromide and an oxidant are dissolved in the seventh solvent and subjected to an oxidation reaction, to obtain the compound of formula (4).

In step (g), the said oxidant is selected from one or more of N-chlorosuccinimide (NCS), N-bromosuccinimide (NBS), 2-iodoylbenzoic acid (IBX), etc.; preferably, is N-chlorosuccinimide (NCS).

In step (g), the molar ratio of BA shown in formula (1), TEMPO, sodium bicarbonate, tetrabutylammonium bromide and the oxidant is 1:(0-1):(0-20):(0-1):(1-5); preferably, is 1:0.01:1.35:0.1:1.15.

In step (g), the seventh solvent is selected from one or more of dichloromethane, tetrahydrofuran, toluene, dimethyl sulfoxide, water, etc.; preferably, is a mixed solvent of dichloromethane and water.

In step (g), the said oxidation reaction temperature is 0~30° C.; preferably, is 0° C.

In step (g), the said oxidation reaction time is 2~8 h; preferably, is 5 h.

In a specific embodiment, the synthesis steps of the compound of formula (4) include: BA shown in formula (1) is dissolved in the seventh solvent, then added with TEMPO, sodium bicarbonate, tetrabutylammonium bromide and NCS and subjected to the oxidation reaction, to obtain the compound of formula (4).

In step (h), the said Wittig reaction refers to: the compound of formula (4) and methyl (triphenylphosphoranylidene)acetate or ethyl (triphenylphosphoranylidene)acetate or propyl 2-(triphenylphosphoranylidene)acetate are dissolved in the eighth solvent and subjected to Wittig reaction, to obtain the compound of formula (5).

Wherein, the molar ratio of the compound of formula (4), methyl (triphenylphosphoranylidene)acetate or ethyl (triphenylphosphoranylidene)acetate or propyl 2-(triphenylphosphoranylidene)acetate is 1:(1~5); preferably, is 1:2.

Wherein, the said eighth solvent is selected from one or more of benzene, toluene, ethyl acetate, tetrahydrofuran, hexane, etc.; preferably, is toluene.

Wherein, the said Wittig reaction temperature is 80~130° C.; preferably, is 110° C.

Wherein, the said Wittig reaction time is 2~8 h; preferably, is 4 h.

Or, in step (h), said Wittig reaction refers to: the compound of formula (4), sodium hydride, methyl phosphonoacetate diethyl ester or triethyl phosphonoacetate or propyl phosphonoacetate diethyl ester are dissolved in the eighth solvent and subjected to Wittig reaction, to obtain the compound of formula (5).

Wherein, the said eighth solvent is selected from one or more of benzene, toluene, ethyl acetate, tetrahydrofuran, hexane, etc.; preferably, is tetrahydrofuran.

Wherein, the molar ratio of the compound of formula (4), sodium hydride, methyl phosphonoacetate diethyl ester or triethyl phosphonoacetate or propyl phosphonoacetate diethyl ester is 1:(1~5):(1~ 5); preferably, is 1:1.5:1.5.

Wherein, the said Wittig reaction temperature is 0~30° C.; preferably, is 0° C.

Wherein, the said Wittig reaction time is 2~8 h; preferably, is 4 h.

In a specific embodiment, the synthesis steps of the compound of formula (5) include: the compound of formula (4) and ethyl (triphenylphosphoranylidene)acetate or the compound of formula (4), sodium hydride, methyl phosphonoacetate diethyl ester or triethyl phosphonoacetate or diethyl phosphonoacetate are dissolved in the eighth solvent and subjected to Wittig reaction, to obtain the compound of formula (5).

In step (i), the said ethylene glycol or neopentyl glycol protection reaction refers to: the compound of formula (5), ethylene glycol or neopentyl glycol, and p-toluenesulfonic acid are dissolved in the ninth solvent and subjected to ethylene glycol or neopentyl glycol protection reaction, to obtain the compound of formula (6); or, the compound of formula (5), ethylene glycol or neopentyl glycol, p-toluenesulfonic acid and triethyl orthoformate are dissolved in the ninth solvent and subjected to ethylene glycol or neopentyl glycol protection reaction, to obtain the compound of formula (6); preferably, the compound of formula (5), ethylene glycol or neopentyl glycol, and p-toluenesulfonic acid are dissolved in the ninth solvent and subjected to ethylene glycol or neopentyl glycol protection reaction, to obtain the compound of formula (6);

In step (i), the said ninth solvent is selected from one or more of benzene, toluene, ethyl acetate, tetrahydrofuran, hexane, etc.; preferably, is toluene.

When the said ethylene glycol or neopentyl glycol protection reaction in step (i) is: the compound of formula (5), ethylene glycol or neopentyl glycol and p-toluenesulfonic acid are dissolved in the ninth solvent and subjected to ethylene glycol or neopentyl glycol protection reaction, to obtain the compound of formula (6), wherein, the molar ratio of the compound of formula (5), ethylene glycol or neopentyl glycol, and p-toluenesulfonic acid is 1:(1-50): (0.01-1), preferably, is 1:10:0.01; the said ethylene glycol or neopentyl glycol protection reaction temperature is 80~130° C., preferably, is 110° C.; the said ethylene glycol or neopentyl glycol protection reaction time is 2~36 h, preferably, is 24 h.

When the said ethylene glycol or neopentyl glycol protection reaction in step (i) is: the compound of formula (5), ethylene glycol or neopentyl glycol, p-toluenesulfonic acid and triethyl orthoformate are dissolved in the ninth solvent and subjected to ethylene glycol or neopentyl glycol protection reaction, to obtain the compound of formula (6), wherein, the molar ratio of the compound of formula (5), ethylene glycol or neopentyl glycol, p-toluenesulfonic acid and triethyl orthoformate is 1:(1-50):(0.01-1):(1-20); preferably, is 1:10:0.1:3; the said ethylene glycol or neopentyl glycol protection reaction temperature is 0~50° C., preferably, is room temperature 25° C.; the said ethylene glycol or neopentyl glycol protection reaction time is 2~36 h, preferably, is 8 h.

In a specific embodiment, the synthesis steps of the compound of formula (6) include: the compound of formula (5) is dissolved in the ninth solvent, reacted with ethylene glycol or neopentyl glycol and p-toluenesulfonic acid which protects the 3-position carbonyl group of the compound of formula (5), to obtain the compound of formula (6).

The present invention also provides compounds shown in formula (6'), formula (6"), formula (7'), formula (7") or formula (8):

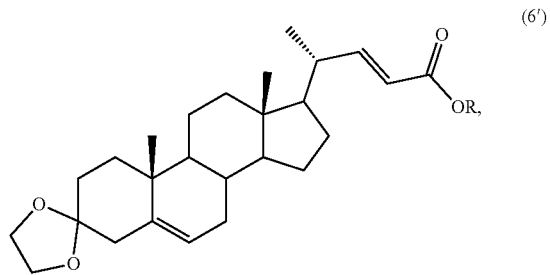

(6')

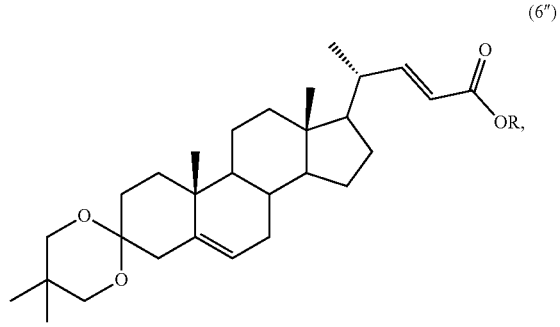

(6")

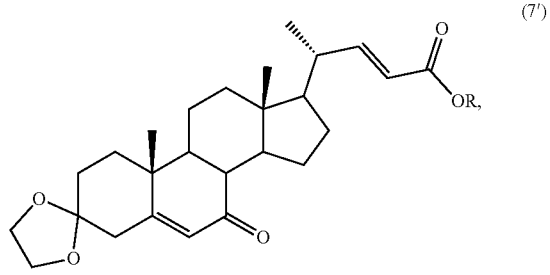

(7')

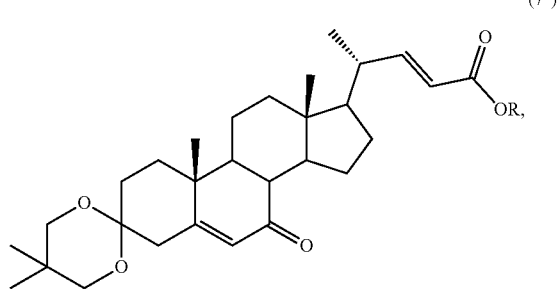

(7")

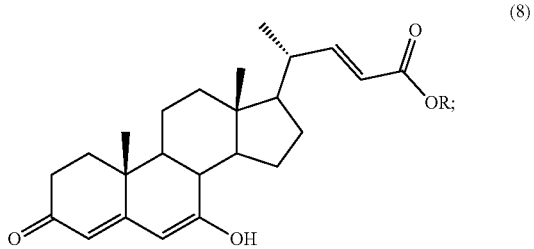

Wherein, R is an alkyl group; preferably, is a C1~C20 alkyl group; more preferably, is a C1, C2 alkyl group.

The compound shown in formula (6) of the present invention includes the compound of the formula (6') and the compound of formula (6"), wherein, the compound of the formula (6') includes the compound of formula (6'-A), the compound of formula (6'-B), the compound of formula (6'-C), etc.; the compound of formula (6") includes the compound of formula (6"-A), the compound of formula (6"-B), the compound of formula (6"-C), etc.

The compound shown in formula (7) of the present invention includes the compound of the formula (7') and the compound of the formula (7"), wherein, the compound of the formula (7') includes the compound of the formula (7'-B), etc.; the compound of the formula (7") includes the compound of formula (7"-B), etc.

The beneficial effects of the present invention include: the preparation method of ursodeoxycholic acid of the present invention uses plant-derived BA as a raw material to avoid the infection problem of pathogenic bacteria and viruses, which is cheap and readily available; the synthesis steps are easy to operate, the yield is high, the reaction is environmentally friendly, the reaction condition is mild, the post-processing is convenient and the cost is low, and industrial production are convenient.

PREFERRED EMBODIMENTS OF THE INVENTION

Figure 1:
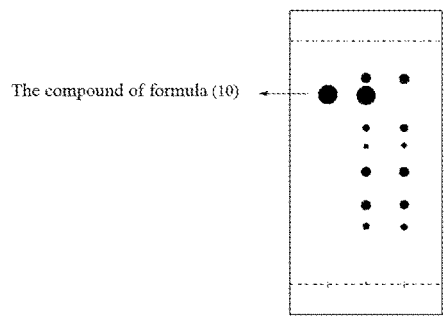
FIG. 1 shows the TLC detection results of the compound of formula (10) oxidized by PDC in Comparative Example 1.

The following examples are given to further illustrate the specific solutions of the present invention. The process, conditions, reagents and experimental methods of the implementation of the present invention are all general knowledge and common knowledge in the field except for the contents specially mentioned below, and the present invention has no special limitation.

Example 1 Preparation of the Compound of Formula (2)

BA (10.0 g, 30.26 mmol), p-toluenesulfonic acid (57 mg, 0.30 mmol), ethylene glycol (16.8 mL, 302.60 mmol), triethyl orthoformate (15.1 mL, 90.78 mmol) and 150 mL of tetrahydrofuran were added in sequence to a 250 mL single-necked flask and reacted for 8 h at room temperature. After the reaction was completed, the resulting mixture was concentrated under reduced pressure, added with 100 mL of water, extracted with ethyl acetate (60 mL×3), washed with water (50 mL×2), washed with saturated sodium chloride solution (50 mL), dried with anhydrous sodium sulfate, concentrated under reduced pressure and purified by silica gel column chromatography (PE/EA=3/1, v/v), to obtain the compound of formula (2) (5.0 g, white solid) with a molar yield of 44%.

BA (10.0 g, 30.26 mmol), p-toluenesulfonic acid (57 mg, 0.30 mmol), ethylene glycol (16.8 mL, 302.60 mmol) and 300 mL of benzene were added in sequence to a 250 mL single-necked flask, and reacted under reflux for 24 h. After the reaction was completed and cooled, 20 mL of saturated sodium bicarbonate solution was added and stirred for 10 min, concentrated under reduced pressure, added with 100 mL of water, extracted with ethyl acetate (60 mL×3), washed with water (50 mL×2), washed with saturated with sodium chloride solution (50 mL), dried with anhydrous sodium sulfate, concentrated under reduced pressure and purified by silica gel column chromatography (PE/EA=3/1, v/v), to obtain the compound of formula (2) (10.0 g, white solid) with a molar yield of 88%. mp: 175-177° C. $^1$H NMR (500 MHz, $CDCl_3$) δ 5.36-5.32 (m, 1H), 3.97-3.90 (m, 4H), 3.63 (dd, J=10.5, 3.2 Hz, 1H), 3.35 (dd, J=10.5, 6.9 Hz, 1H), 2.58-2.53 (m, 1H), 2.11 (dd, J=14.2, 2.9 Hz, 1H), 2.03-1.91 (m, 2H), 1.85-1.72 (m, 3H), 1.69-1.58 (m, 3H), 1.57-1.49 (m, 2H), 1.49-1.39 (m, 2H), 1.36-1.27 (m, 3H), 1.22-1.15 (m, 2H), 1.12-1.07 (m, 1H), 1.04 (d, J=6.7 Hz, 3H), 1.02 (s, 3H), 1.00-0.97 (m, 1H), 0.70 (s, 3H). $^{13}$C NMR (125 MHz, $CDCl_3$) δ 140.26, 122.25, 109.60, 68.12, 64.55, 64.34, 56.59, 52.52, 49.79, 42.55, 41.91, 39.74, 38.90, 36.73, 36.45, 32.04, 31.84, 31.19, 27.85, 24.51, 21.16, 19.00, 16.89, 12.07. HRMS (ESI): calcd for $C_{24}H_{38}NaO_3$ $[M+Na]^+$, 397.2713, found 397.2704.

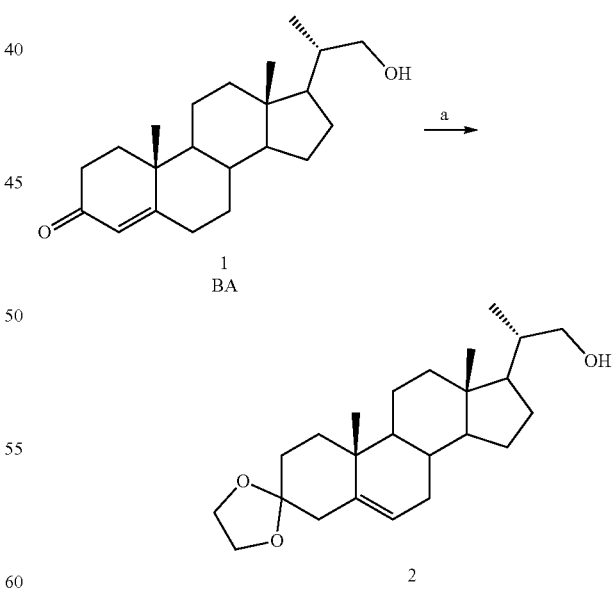

Example 2 Preparation of the Compound of Formula (3)

The compound of formula (2) (5.0 g, 13.35 mmol), IBX (7.5 g, 26.70 mmol), 50 mL of THF and 50 mL of DMSO were added in sequence to a 250 mL single-necked flask and reacted for 5 h at room temperature. After the completion of the reaction was detected by TLC, the resulting mixture was added with water, filtered with suction, extracted with dichloromethane (50 mL×3), washed with water (50 mL×2), washed with saturated sodium bicarbonate solution (50 mL), dried with anhydrous sodium sulfate, concentrated under reduced pressure and purified by silica gel column chromatography (PE/EA=3/1, v/v), to obtain the compound of formula (3) (4.9 g, white solid) with a molar yield of 98%.

The compound of formula (2) (10.1 g, 26.96 mmol), TEMPO (42 mg, 0.27 mmol), 100 mL of dichloromethane, a solution of sodium bicarbonate (3.1 g, 36.40 mmol) and tetrabutyl ammonium bromide (870 mg, 2.70 mmol) in water (40 mL), and NCS (4.1 g, 31.00 mmol) were added in sequence to a 500 mL single-neck flask and reacted for 5 h at 0° C. After the completion of reaction was detected by TLC, the resulting mixture was added with sodium thiosulfate pentahydrate solution (1.3 g sodium thiosulfate pentahydrate in 25 mL water), stirred at 5-10° C. for 20 min, separated, and extracted with dichloromethane (50 mL×3), added with 120 mL of 1% sodium hydroxide solution, stirred for 30 min and the layers were separated. The aqueous phase was back-extracted once with dichloromethane (50 mL), washed with water, and concentrated under reduced pressure to obtain the compound of formula (3) (9.6 g, pale yellow solid) with a molar yield of 95%. mp: 168-171° C. $^1$H NMR (500 MHz, CDCl$_3$) δ 9.56 (d, J=3.3 Hz, 1H), 5.36-5.31 (m, 1H), 3.97-3.90 (m, 4H), 2.58-2.53 (m, 1H), 2.39-2.31 (m, 1H), 2.11 (dd, J=14.2, 2.9 Hz, 1H), 2.00-1.93 (m, 2H), 1.91-1.82 (m, 1H), 1.81-1.73 (m, 2H), 1.68-1.62 (m, 3H), 1.59-1.53 (m, 1H), 1.52-1.44 (m, 3H), 1.40-1.29 (m, 2H), 1.28-1.15 (m, 2H), 1.12 (d, J=6.8 Hz, 3H), 1.11-1.03 (m, 2H), 1.02 (s, 3H), 0.72 (s, 3H). $^{13}$C NMR (125 MHz, CDCl$_3$) δ 205.20, 140.26, 122.10, 109.54, 64.56, 64.35, 56.11, 51.08, 49.79, 49.61, 43.09, 41.90, 39.58, 36.74, 36.45, 32.01, 31.80, 31.19, 27.16, 24.78, 21.10, 19.00, 13.59, 12.37. HRMS (ESI): calcd for C$_{24}$H$_{36}$NaO$_3$ [M+Na]$^+$, 395.2557, found 395.2542.

Example 3 Preparation of the Compound of Formula (6')

The compound of formula (3) (1.0 g, 2.68 mmol), methyl (triphenylphosphoranylidene)acetate (1.7 g, 5.36 mmol) and 15 mL of toluene were added in sequence to a 100 mL single-necked flask and reacted under reflux for 4 h. After the completion of the reaction was detected by TLC, the resulting mixture was concentrated under reduced pressure and purified by silica gel column chromatography (PE/EA=3/1, v/v), to obtain the compound of formula (6'-A) (1.13 g, white solid) with a molar yield of 98%.

Sodium hydride (161 mg, 4.02 mmol) and 10 mL of tetrahydrofuran were added in a 100 mL single-necked flask, stirred for 15 min, then added in sequence with trimethyl phosphonoacetate (0.65 mL, 4.02 mmol), the compound of formula (3) (1.0 g, 2.68 g mmol) and reacted for 4 h at 0° C. After the completion of the reaction was detected by TLC, the resulting mixture was concentrated under reduced pressure and purified by silica gel column chromatography (PE/EA=3/1, v/v), to obtain the compound of formula (6'-A) (1.12 g, white solid) with a molar yield of 97%. mp: 161-162° C. $^1$H NMR (500 MHz, CDCl$_3$) δ 6.83 (dd, J=15.6, 9.0 Hz, 1H), 5.73 (d, J=15.6 Hz, 1H), 5.36-5.30 (m, 1H), 3.97-3.90 (m, 4H), 3.71 (s, 3H), 2.62-2.51 (m, 1H), 2.31-2.23 (m, 1H), 2.13-2.08 (m, 1H), 2.01-1.91 (m, 2H), 1.81-1.64 (m, 5H), 1.63-1.51 (m, 3H), 1.51-1.41 (m, 2H), 1.36-1.29 (m, 1H), 1.27-1.20 (m, 3H), 1.08 (d, J=6.6 Hz, 3H), 1.04 (dd, J=11.0, 4.0 Hz, 2H), 1.02 (s, 3H), 0.71 (s, 3H). $^{13}$C NMR (125 MHz, CDCl$_3$) δ 167.61, 155.18, 140.24, 122.20, 118.65, 109.57, 64.56, 64.35, 56.62, 54.98, 51.49, 49.77, 42.80, 41.90, 39.88, 39.71, 36.75, 36.45, 32.02, 31.80, 31.19, 28.22, 24.42, 21.13, 19.37, 19.00, 12.25.

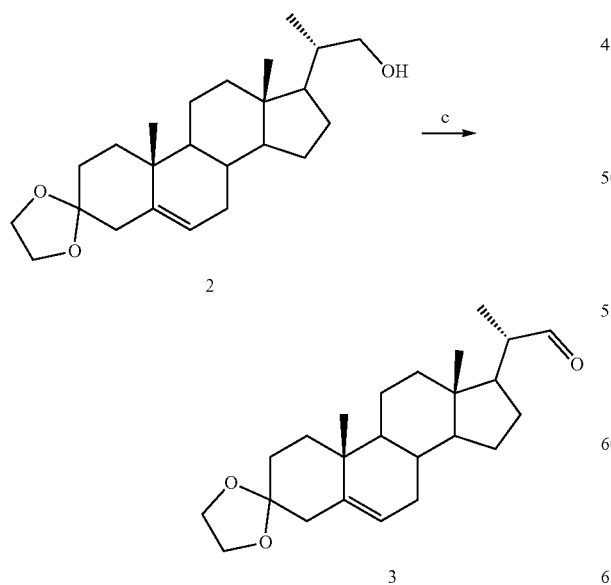

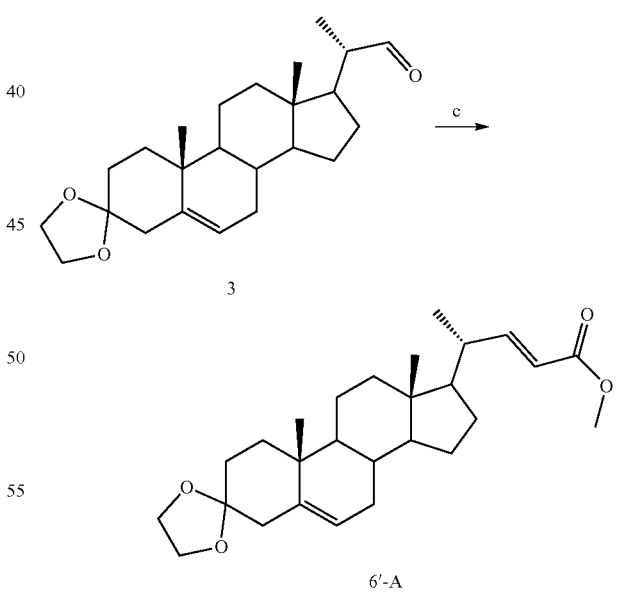

The compound of formula (3) (9.6 g, 25.77 mmol), ethyl (triphenylphosphoranylidene)acetate (18.0 g, 51.54 mmol) and 150 mL of toluene were added in sequence to a 500 mL single-necked flask and reacted under reflux for 4 h. After the completion of the reaction was detected by TLC, the resulting mixture was concentrated under reduced pressure and purified by silica gel column chromatography (PE/

EA=3/1, v/v), to obtain the compound of formula (6'-B) (11.2 g, white solid) with a molar yield of 98%.

Sodium hydride (805 mg, 20.13 mmol) and 50 mL of tetrahydrofuran were added in a 250 mL single-necked flask, stirred for 15 min, then added with triethyl phosphonoacetate (4.0 mL, 20.13 mmol), the compound of formula (3) (5.0 g, 13.42 mmol) and reacted for 4 h at 0° C. After the completion of the reaction was detected by TLC, the resulting mixture was concentrated under reduced pressure, slurried with methanol, to obtain the compound of formula (6'-B) (5.65 g, white solid) with a molar yield of 95%. mp: 122-124° C. $^1$H NMR (500 MHz, CDCl$_3$) δ 6.82 (dd, J=15.6, 8.9 Hz, 1H), 5.72 (d, J=15.6 Hz, 1H), 5.39-5.28 (m, 1H), 4.16 (q, J=7.1 Hz, 2H), 3.97-3.90 (m, 4H), 2.58-2.53 (m, 1H), 2.26 (d, J=6.7 Hz, 1H), 2.11 (dd, J=14.2, 2.9 Hz, 1H), 2.00-1.92 (m, 2H), 1.81-1.73 (m, 2H), 1.72-1.61 (m, 3H), 1.60-1.52 (m, 2H), 1.51-1.41 (m, 2H), 1.37-1.30 (m, 1H), 1.27 (t, J=7.1 Hz, 3H), 1.25-1.18 (m, 3H), 1.08 (d, J=6.7 Hz, 3H), 1.04-1.06 (m, 2H), 1.02 (s, 3H), 1.00-0.97 (m, 1H), 0.71 (s, 3H). $^{13}$C NMR (125 MHz, CDCl$_3$) δ 167.20, 154.84, 140.24, 122.20, 119.07, 109.57, 64.56, 64.35, 60.22, 56.63, 55.01, 49.78, 42.79, 41.91, 39.85, 39.72, 36.75, 36.45, 32.02, 31.80, 31.20, 28.25, 24.42, 21.14, 19.38, 19.00, 14.42, 12.24. HRMS(ESI): calcd for $C_{28}H_{42}NaO_4$ [M+Na]$^+$, 465.2975, found 465.2990.

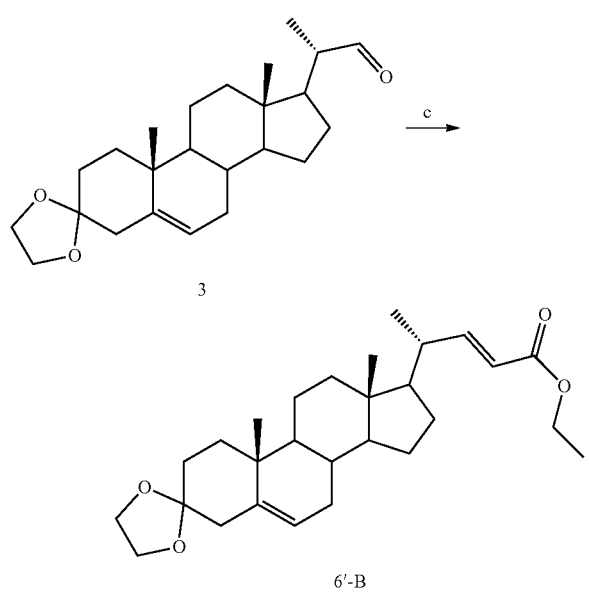

The compound of formula (3) (1.0 g, 2.68 mmol), propyl 2-(triphenylphosphoranylidene)acetate (1.85 g, 5.36 mmol) and 15 mL of toluene were added in sequence to a 100 mL single-necked flask and reacted under reflux for 4 h. After the completion of the reaction was detected by TLC, the resulting mixture was concentrated under reduced pressure and purified by silica gel column chromatography (PE/EA=3/1, v/v) to obtain the compound of formula (6'-C) (1.2 g, white solid) with a molar yield of 98%. mp: 108-110° C. $^1$H NMR (500 MHz, CDCl$_3$) δ 6.82 (dd, J=15.6, 8.9 Hz, 1H), 5.73 (d, J=15.6 Hz, 1H), 5.40-5.30 (m, 1H), 4.07 (t, J=6.7 Hz, 2H), 3.97-3.89 (m, 4H), 2.55 (dd, J=14.2, 2.6 Hz, 1H), 2.30-2.23 (m, 1H), 2.11 (dd, J=14.2, 2.8 Hz, 1H), 2.01-1.92 (m, 2H), 1.81-1.73 (m, 2H), 1.70-1.62 (m, 5H), 1.60-1.52 (m, 2H), 1.50-1.41 (m, 2H), 1.36-1.18 (m, 5H), 1.08 (d, J=6.6 Hz, 3H), 1.06-1.04 (m, 1H), 1.02 (s, 3H), 1.01-0.97 (m, 1H), 0.95 (t, J=7.4 Hz, 3H), 0.71 (s, 3H). $^{13}$C NMR (125 MHz, CDCl$_3$) δ 167.30, 154.82, 140.24, 122.20, 119.06, 109.57, 65.88, 64.56, 64.35, 56.63, 55.02, 49.78, 42.79, 41.91, 39.84, 39.72, 36.75, 36.45, 32.02, 31.80, 31.20, 28.24, 24.42, 22.18, 21.14, 19.37, 19.00, 12.24, 10.58.

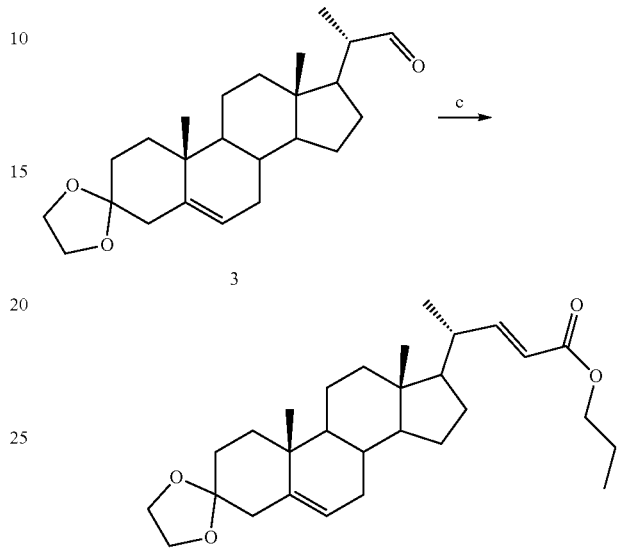

Example 4 Preparation of the Compound of Formula (4)

BA (5.0 g, 15.13 mmol), IBX (8.5 g, 30.26 mmol), 50 mL of THF and 50 mL of DMSO were added in sequence to a 250 mL single-neck flask and reacted for 5 h at room temperature. After the completion of the reaction was detected by TLC, the resulting mixture was added with water, filtered with suction, extracted with dichloromethane (50 mL×3), washed with water (50 mL×2), washed with saturated sodium bicarbonate solution (50 mL), dried with anhydrous sodium sulfate, concentrated under reduced pressure, and purified by silica gel column chromatography (PE/EA=3/1, v/v), to obtain the compound of formula (3) (4.9 g, white solid) with a molar yield of 98%.

BA (10.0 g, 30.26 mmol), TEMPO (47 mg, 0.30 mmol), 100 mL of dichloromethane, sodium bicarbonate (3.43 g, 40.85 mmol) and tetrabutyl ammonium bromide (977 mg, 3.03 mmol) in water (40 mL), NCS (4.65 g, 34.80 mmol) were added in sequence to a 500 mL single-necked flask to react for 5 h at 0° C. After the completion of the reaction was detected by TLC, the resulting mixture was added with sodium thiosulfate pentahydrate solution (1.5 g sodium thiosulfate pentahydrate/30 mL water), stirred for 20 min at 5-10° C., separated, extracted with dichloromethane (50 mL×3), added with 135 mL of 1% sodium hydroxide solution, stirred for 30 min, and separated. The aqueous phase was back-extracted once with dichloromethane (50 mL), washed with water, and concentrated under reduced pressure, to obtain the compound of formula (4) (9.5 g, pale yellow solid) with a molar yield of 95%. mp: 155-157° C. $^1$H NMR (400 MHz, CDCl$_3$) δ 9.55 (s, 1H), 5.71 (s, 1H), 2.45-2.23 (m, 5H), 1.99 (t, J=13.7 Hz, 2H), 1.91-1.78 (m, 2H), 1.68 (t, J=10.2 Hz, 2H), 1.43 (m, 5H), 1.30-1.19 (m, 2H), 1.17 (s, 3H), 1.11 (d, J=5.5 Hz, 3H), 1.06-0.89 (m, 3H), 0.75 (s, 3H). $^{13}$C NMR (100 MHz, CDCl$_3$) δ 205.00, 199.65, 171.31, 123.99, 55.25, 53.84, 51.04, 49.54, 43.10, 39.39, 38.68, 35.80, 35.68, 34.06, 32.93, 32.05, 27.11, 24.64, 21.06, 17.48, 13.53, 12.44. HRMS(ESI): calcd for C$_{22}$H$_{32}$NaO$_2$ [M+Na]$^+$, 351.2295, found 351.2292.

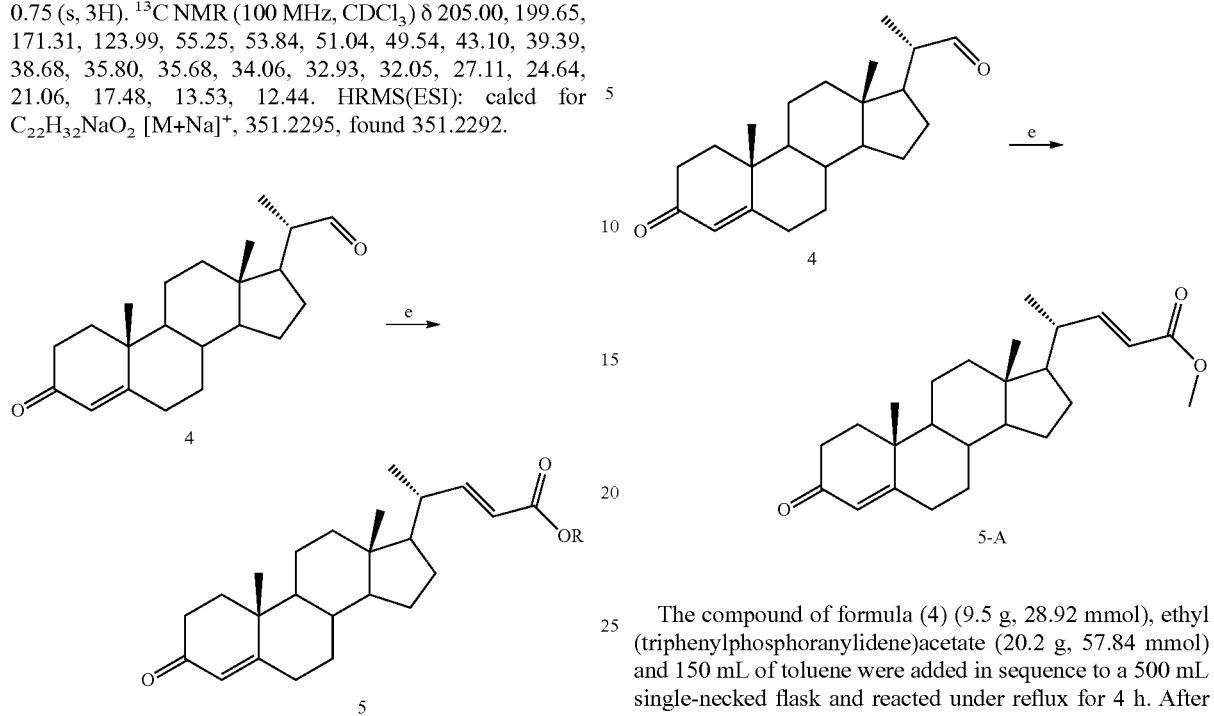

Example 5 Preparation of the Compound of Formula (5)

The compound of formula (4) (1.0 g, 3.04 mmol), methyl (triphenylphosphoranylidene)acetate (1.92 g, 6.08 mmol) and 15 mL of toluene were added in sequence to a 100 mL single-necked flask and reacted under reflux for 4 h. After the completion of the reaction was detected by TLC, the resulting mixture was concentrated under reduced pressure, and purified by silica gel column chromatography (PE/EA=3/1, v/v), to obtain the compound of formula (5-A) (1.15 g, white solid) with a molar yield of 98%.

Sodium hydride (182 mg, 4.56 mmol) and 10 mL of tetrahydrofuran were added in sequence to a 100 mL single-necked flask, stirred for 15 min, and added in sequence with methyl phosphonoacetate diethyl ester (0.75 mL, 4.56 mmol) and the compound of formula (4) (1.0 g, 3.04 mmol), then reacted for 4 h at 0° C. After the completion of the reaction was detected by TLC, the resulting mixture was concentrated under reduced pressure, and purified by silica gel column chromatography (PE/EA=3/1, v/v), to obtain the compound of formula (5-A) (1.14 g, white solid) with a molar yield of 97%. mp: 142-144° C. $^1$H NMR (500 MHz, CDCl$_3$) δ 6.81 (dd, J=15.6, 9.0 Hz, 1H), 5.73 (d, J=15.8 Hz, 1H), 5.71 (s, 1H), 3.70 (s, 3H), 2.43-2.23 (m, 5H), 2.04-1.97 (m, 2H), 1.82 (ddd, J=11.3, 6.5, 4.1 Hz, 1H), 1.69 (ddd, J=14.3, 9.1, 3.7 Hz, 2H), 1.60 (ddd, J=11.8, 5.8, 2.7 Hz, 1H), 1.53 (ddd, J=14.1, 6.9, 3.7 Hz, 2H), 1.50-1.38 (m, 1H), 1.28-1.19 (m, 3H), 1.17 (s, 3H), 1.15-1.09 (m, 1H), 1.07 (d, J=6.6 Hz, 3H), 1.05-0.97 (m, 2H), 0.96-0.88 (m, 1H), 0.73 (s, 3H). $^{13}$C NMR (125 MHz, CDCl$_3$) δ 199.63, 171.43, 167.53, 154.86, 123.94, 118.80, 55.77, 54.97, 53.85, 51.51, 42.83, 39.81, 39.54, 38.69, 35.81, 35.70, 34.08, 32.98, 32.06, 28.17, 24.28, 21.10, 19.32, 17.49, 12.33.

The compound of formula (4) (9.5 g, 28.92 mmol), ethyl (triphenylphosphoranylidene)acetate (20.2 g, 57.84 mmol) and 150 mL of toluene were added in sequence to a 500 mL single-necked flask and reacted under reflux for 4 h. After the completion of the reaction was detected by TLC, the resulting mixture was concentrated under reduced pressure and purified by silica gel column chromatography (PE/EA=3/1, v/v), to obtain the compound of formula (5-B) (11.3 g, white solid) with a molar yield of 98%.

Sodium hydride (913 mg, 22.83 mmol) and 50 mL of tetrahydrofuran were added to a 250 mL single-necked flask, stirred for 15 min, and added with triethyl phosphonoacetate (4.5 mL, 22.83 mmol) and the compound of formula (3) (5.0 g, 15.22 g) mmol), then reacted for 4 h at 0° C. After the completion of the reaction was detected by TLC, the resulting mixture was concentrated under reduced pressure and slurried with methanol, to obtain the compound of formula (5-B) (5.6 g, white solid) with a molar yield of 92%. mp: 160-162° C. $^1$H NMR (400 MHz, CDCl$_3$) δ 6.81 (dd, J=15.3, 9.0 Hz, 1H), 5.71 (d, J=13.4 Hz, 2H), 4.24-4.09 (m, 2H), 2.45-2.21 (m, 5H), 2.00 (d, J=12.6 Hz, 2H), 1.80 (m, 1H), 1.76-1.33 (m, 7H), 1.26 (m, 6H), 1.17 (s, 3H), 1.08 (d, J=6.2 Hz, 3H), 1.05-0.86 (m, 3H), 0.73 (s, 3H). $^{13}$C NMR (100 MHz, CDCl$_3$) δ 199.70, 171.51, 167.16, 154.56, 123.94, 119.21, 60.27, 55.78, 54.98, 53.84, 42.82, 39.80, 39.54, 38.69, 35.80, 35.70, 34.08, 32.98, 32.06, 28.19, 24.28, 21.10, 19.31, 17.49, 14.40, 12.32. HRMS(ESI): calcd for C$_{26}$H$_{38}$NaO$_3$ [M+Na]$^+$, 421.2713, found 421.2708.

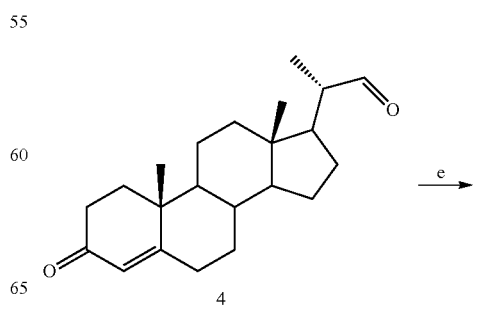

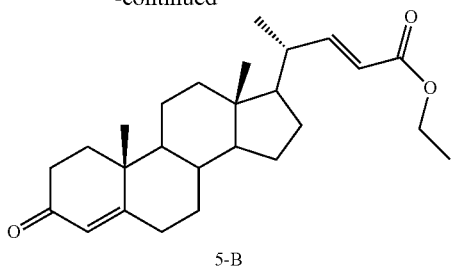

5-B

The compound of formula (4) (1.0 g, 3.04 mmol), propyl 2-(triphenylphosphoranylidene)acetate (2.1 g, 6.08 mmol) and 15 mL of toluene were added in sequence to a 100 mL single-neck flask and reacted under reflux for 4 h. After the completion of the reaction was detected by TLC, the resulting mixture was concentrated under reduced pressure and purified by silica gel column chromatography (PE/EA=3/1, v/v), to obtain the compound of formula (5-C) (1.23 g, white solid) with a molar yield of 98%. mp: 144-146° C. $^1$H NMR (500 MHz, CDCl$_3$) δ 6.81 (dd, J=15.6, 8.9 Hz, 1H), 5.73 (d, J=16.3 Hz, 1H), 5.71 (s, 1H), 4.06 (t, J=6.7 Hz, 2H), 2.44-2.22 (m, 5H), 2.03-1.97 (m, 2H), 1.85-1.78 (m, 1H), 1.74-1.64 (m, 4H), 1.63-1.57 (m, 1H), 1.57-1.50 (m, 2H), 1.48-1.39 (m, 1H), 1.29-1.20 (m, 3H), 1.17 (s, 3H), 1.15-1.09 (m, 1H), 1.08 (d, J=6.6 Hz, 3H), 1.06-0.97 (m, 2H), 0.94 (t, J=7.4 Hz, 3H), 0.93-0.89 (m, 1H), 0.74 (s, 3H).

and purified by silica gel column chromatography (PE/EA=3/1, v/v), to obtain the compound of formula (6'-B) (3.0 g, white solid) with a molar yield of 54%.

The compound of formula (5-B) (5.0 g, 12.54 mmol), p-toluenesulfonic acid (25 mg, 0.13 mmol), ethylene glycol (7.0 mL, 125.40 mmol) and 150 mL of toluene were added in sequence to a 250 mL single-necked flask and reacted under reflux for 24 h. After the reaction was completed and cooled, the resulting mixture was added with 20 mL of saturated sodium bicarbonate solution, stirred for 10 min, concentrated under reduced pressure, then added with 100 mL of water, extracted with ethyl acetate (50 mL×3), washed with water (50 mL×2), washed with saturated with sodium chloride solution (50 mL), dried with anhydrous sodium sulfate, concentrated under reduced pressure, and purified by silica gel column chromatography (PE/EA=3/1, v/v), to obtain the compound of formula (6'-B) (4.9 g, white solid)) with a molar yield is 88%. mp: 122-124° C. $^1$H NMR (500 MHz, CDCl$_3$) δ 6.82 (dd, J=15.6, 8.9 Hz, 1H), 5.72 (d, J=15.6 Hz, 1H), 5.39-5.28 (m, 1H), 4.16 (q, J=7.1 Hz, 2H), 3.97-3.90 (m, 4H), 2.58-2.53 (m, 1H), 2.26 (d, J=6.7 Hz, 1H), 2.11 (dd, J=14.2, 2.9 Hz, 1H), 2.00-1.92 (m, 2H), 1.81-1.73 (m, 2H), 1.72-1.61 (m, 3H), 1.60-1.52 (m, 2H), 1.51-1.41 (m, 2H), 1.37-1.30 (m, 1H), 1.27 (t, J=7.1 Hz, 3H), 1.25-1.18 (m, 3H), 1.08 (d, J=6.7 Hz, 3H), 1.04-1.06 (m, 2H), 1.02 (s, 3H), 1.00-0.97 (m, 1H), 0.71 (s, 3H). $^{13}$C NMR (125 MHz, CDCl$_3$) δ 167.20, 154.84, 140.24, 122.20, 119.07, 109.57, 64.56, 64.35, 60.22, 56.63, 55.01, 49.78, 42.79, 41.91, 39.85, 39.72, 36.75, 36.45, 32.02, 31.80, 31.20, 28.25, 24.42, 21.14, 19.38, 19.00, 14.42, 12.24. HRMS(ESI): calcd for C$_{28}$H$_{42}$NaO$_4$ [M+Na]$^+$, 465.2975, found 465.2990.

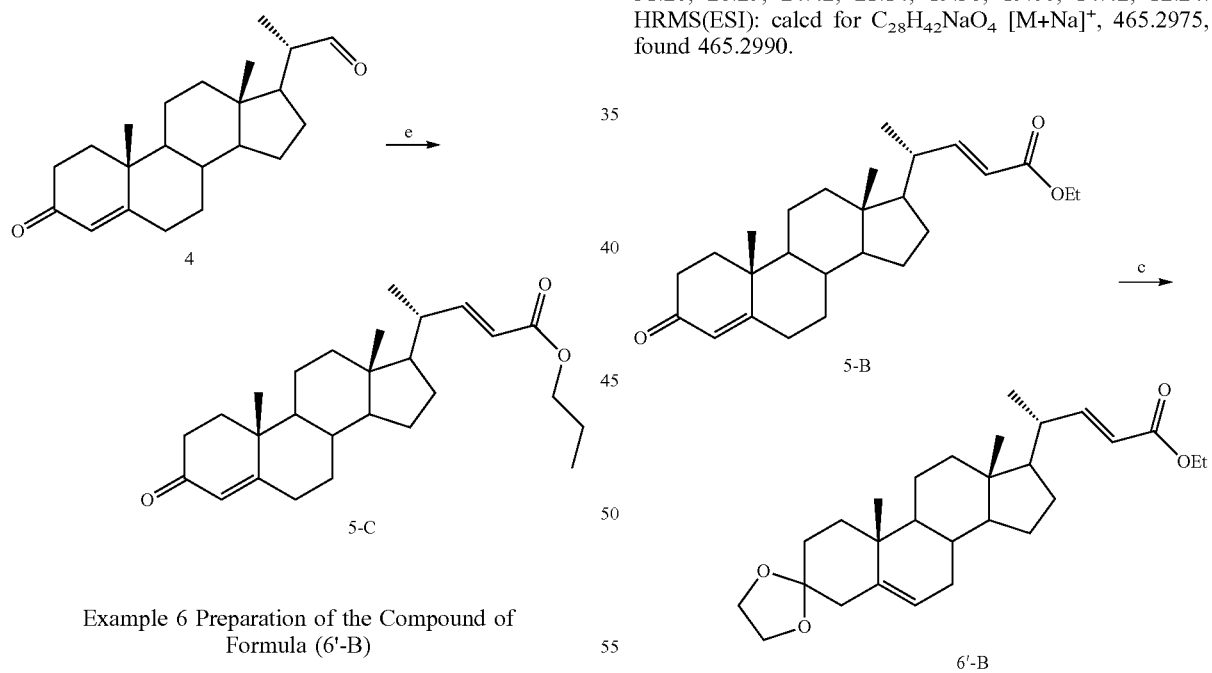

Example 6 Preparation of the Compound of Formula (6'-B)

The compound of formula (5-B) (5.0 g, 12.54 mmol), p-toluenesulfonic acid (25 mg, 0.13 mmol), ethylene glycol (7.0 mL, 125.40 mmol), triethyl orthoformate Ester (6.3 mL, 37.62 mmol) and 150 mL of tetrahydrofuran were added in sequence to a 250 mL single-necked flask and reacted for 8 h at room temperature. After the reaction was completed, the resulting mixture was concentrated under reduced pressure, added with 100 mL of water, extracted with ethyl acetate (60 mL×3), washed with water (50 mL×2), washed with saturated sodium chloride solution (50 mL), dried with anhydrous sodium sulfate, concentrated under reduced pressure Example 7 Preparation of the Compound of Formula (6"-B)

The compound of formula (5-B) (10.0 g, 25.09 mmol), neopentyl glycol (6.33 g, 60.7 mmol), p-toluenesulfonic acid monohydrate (215 mg, 1.13 mmol) and toluene (25 mL) were added in sequence to a 100 mL single-necked flask, and triethyl orthoformate (7.5 mL, 45.16 mmol) was added dropwise, then reacted for 2 h at room temperature. After the completion of the reaction was detected by TLC, 30 mL of saturated NaHCO$_3$ was added to the reaction solution, stirred for 10 min, added with 100 mL of water, extracted with ethyl acetate (50 mL*3). The organic phases were combined, washed with saturated brine (50 mL), dried with anhydrous sodium sulfate and concentrated under reduced pressure to obtain a pale yellow solid. The pale yellow solid was added to 25 mL of ethanol, slurried for 12 h at room temperature and suction filtered, to obtain compound 6″-B (9 g, white solid) with a molar yield of 74%. $^1$H NMR (500 MHz, CDCl$_3$) δ 6.83 (dd, J=15.6, 8.9 Hz, 1H), 5.73 (d, J=15.6 Hz, 1H), 5.41-5.16 (m, 1H), 4.17 (q, J=7.1 Hz, 2H), 3.49 (m, 4H), 2.56 (dd, J=14.3, 2.8 Hz, 1H), 2.37-2.13 (m, 3H), 2.03-1.85 (m, 2H), 1.67 (dd, J=21.0, 8.2 Hz, 2H), 1.57-1.38 (m, 8H), 1.34-1.15 (m, 7H), 1.08 (t, J=7.7 Hz, 3H), 1.04-0.94 (m, 7H), 0.91 (s, 3H), 0.71 (s, 3H). $^{13}$C NMR (126 MHz, CDCl$_3$) δ 167.11, 154.75, 139.61, 122.07, 118.93, 98.40, 70.21, 69.88, 60.11, 56.51, 54.89, 49.60, 42.67, 39.97, 39.74, 39.60, 36.88, 34.97, 31.89, 31.69, 30.12, 28.13, 27.66, 24.29, 22.79, 22.65, 20.98, 19.24, 19.05, 14.29, 12.11.

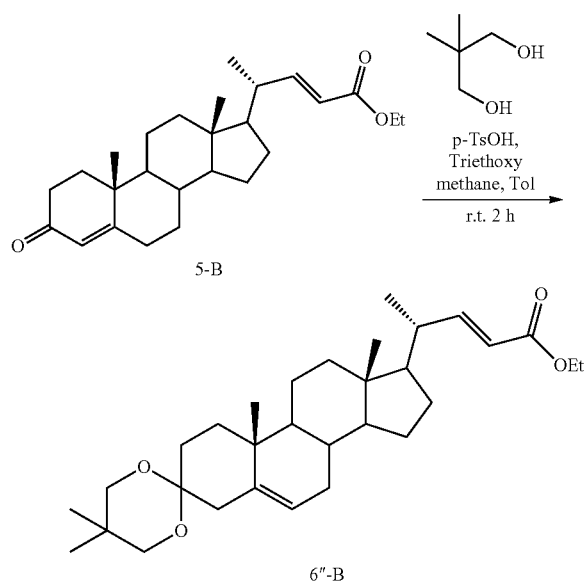

Example 8 Preparation of the Compound of Formula (7'-B)

For the preparation of the compound of formula (7'-B), the present invention tested various oxidation reaction conditions (as shown in Table 1), and obtained the best oxidation reaction conditions (as shown in Table 1, Entry 23).

TABLE 1

Oxidation of the compound of formula (6'-B).[a]

| Entry | Solvent | Oxidant | Reaction Temperature (° C.) | Yield (%) |
|---|---|---|---|---|
| 1 | Toluene | Na$_2$Cr$_2$O$_7$/NHPI | 25 | N[b] |
| 2 | Toluene | Na$_2$Cr$_2$O$_7$/NHPI/AcOH | 25 | 54 |
| 3 | Toluene | K$_2$Cr$_2$O$_7$/NHPI/AcOH | 25 | 52 |
| 4 | Toluene | PDC/NHPI | 25 | 66 |
| 5 | Toluene | PDC/TBHP | 25 | 43 |
| 6 | Toluene | BPO/NHPI | 25 | 42 |
| 7 | Acetone | Na$_2$Cr$_2$O$_7$/NHPI | 25 | N[b] |
| 8 | Acetone | Na$_2$Cr$_2$O$_7$/NHPI/AcOH | 25 | 62 |
| 9 | Acetone | K$_2$Cr$_2$O$_7$/NHPI/AcOH | 25 | 61 |
| 10 | Acetone | PDC/NHPI | 25 | 72 |
| 11 | Acetone | PDC/TBHP | 25 | 59 |
| 12 | Acetone | BPO/NHPI | 25 | 51 |
| 13 | N,N-Dimethylformamide | PDC/NHPI | 25 | 38 |
| 14 | tert-Butanol | PDC/NHPI | 25 | N[b] |
| 15 | Ethyl acetate | PDC/NHPI | 25 | N[b] |
| 16 | Acetonitrile | PDC/NHPI | 25 | 70 |
| 17 | N-Methylpyrrolidone | PDC/NHPI | 25 | N[b] |
| 18 | Dichloromethane | PDC/NHPI | 25 | 68 |
| 19 | Acetonitrile/Water (4:1, v/v) | PDC/NHPI | 25 | 77 |
| 20 | Acetonitrile/Water (9:1, v/v) | PDC/NHPI | 25 | 79 |
| 21 | Acetonitrile/Water (14:1, v/v) | PDC/NHPI | 25 | 79 |
| 22 | Acetone/Water (4:1, v/v) | PDC/NHPI | 25 | 80 |
| 23 | Acetone/Water (9:1, v/v) | PDC/NHPI | 25 | 85 |
| 24 | Acetone/Water (14:1, v/v) | PDC/NHPI | 25 | 82 |
| 25 | Acetone/Water (9:1, v/v) | PDC/NHPI | 0 | 65 |
| 26 | Acetone/Water (9:1, v/v) | PDC/NHPI | 50 | 73 | a. All reaction times were 20 h, oxidant/compound 6'-B=1.1:1 (mol:mol).
b. No react.

It can be seen from Table 1 that the optimal reaction conditions were obtained by screening and optimizing the solvent, oxidant and reaction temperature, namely, the optimal reaction solvent was acetone/water (9:1), the optimal oxidant was PDC, and the optimal reaction temperature was at 25° C., and the reaction yield reached 85%.

Some of the examples are as follows:

The compound of formula (6'-B) (1.0 g, 2.26 mmol), 20 mL of acetone, NHPI (400 mg, 2.49 mmol), and PDC (940 mg, 2.49 mmol) were added in sequence to a 250 mL single-necked flask and reacted at room temperature for 20 h. After the completion of the reaction was detected by TLC, the resulting mixture was suction filtered with diatomite. The filtrate was concentrated under reduced pressure and purified by silica gel column chromatography (PE/EA=3/1, v/v), to obtain the compound of formula (7'-B) (743 mg, white solid)), the molar yield was 72%.

The compound of formula (6'-B) (1.0 g, 2.26 mmol), 20 mL of acetonitrile, NHPI (400 mg, 2.49 mmol), and PDC (940 mg, 2.49 mmol) were added in sequence to a 250 mL single-necked flask and reacted at room temperature for 20 h. After the completion of the reaction was detected by TLC, the resulting mixture was suction filtered with diatomite. The filtrate was concentrated under reduced pressure and purified by silica gel column chromatography (PE/EA=3/1, v/v), to obtain the compound of formula (7'-B) (722 mg, white solid) with a molar yield of 70%.

The compound of formula (6'-B) (1.0 g, 2.26 mmol), 20 mL of acetone, NHPI (400 mg, 2.49 mmol), Na$_2$Cr$_2$O$_7$·2H$_2$O (742 mg, 2.49 mmol), AcOH (0.4 mL, 6.78 mmol) and reacted for 20 h at room temperature. After the completion of the reaction was detected by TLC, the resulting mixture was suction filtered with diatomite. The filtrate was concentrated under reduced pressure and purified by silica gel column chromatography (PE/EA=3/1, v/v), to obtain the compound of formula (7'-B) (640 mg, white solid)) with a molar yield of 62%.

The compound of formula (6'-B) (5.0 g, 11.30 mmol), 90 mL of acetone, 10 mL of water, NHPI (2.0 g, 12.43 mmol), PDC (4.7 g, 12.43 mmol) were added in sequence to a 250 mL single-necked flask and reacted for 20 hours at room temperature. After the completion of the reaction was detected by TLC, the resulting mixture was suction filtered with diatomite. The filtrate was concentrated under reduced pressure, and purified by silica gel column chromatography (PE/EA=3/1, v/v), to obtain the compound of formula (7'-B) (4.4 g, white solid)) with a molar yield of 85%. mp: 139-141° C. $^1$H NMR (500 MHz, CDCl$_3$) δ 6.82 (dd, J=15.6, 9.0 Hz, 1H), 5.72 (d, J=15.6 Hz, 1H), 5.65 (d, J=1.7 Hz, 1H), 4.16 (q, J=7.1 Hz, 2H), 3.98-3.90 (m, 4H), 2.66 (dd, J=14.7, 1.8 Hz, 1H), 2.44-2.36 (m, 1H), 2.34-2.18 (m, 3H), 2.02-1.95 (m, 1H), 1.89-1.83 (m, 2H), 1.78-1.71 (m, 2H), 1.64-1.52 (m, 3H), 1.52-1.43 (m, 1H), 1.27 (m, 8H), 1.19 (s, 3H), 1.08 (d, J=6.6 Hz, 3H), 0.70 (s, 3H). $^{13}$C NMR (125 MHz, CDCl$_3$) δ 201.52, 167.11, 164.66, 154.53, 126.73, 119.23, 108.98, 64.70, 64.62, 60.24, 53.82, 50.01, 49.65, 45.41, 43.58, 41.84, 39.59, 38.65, 38.35, 35.73, 31.16, 28.34, 26.44, 21.25, 19.58, 17.08, 14.40, 12.40. HRMS(ESI): calcd for $C_{28}H_{40}NaO_5$ [M+Na]$^+$, 479.2768, found 479.2770.

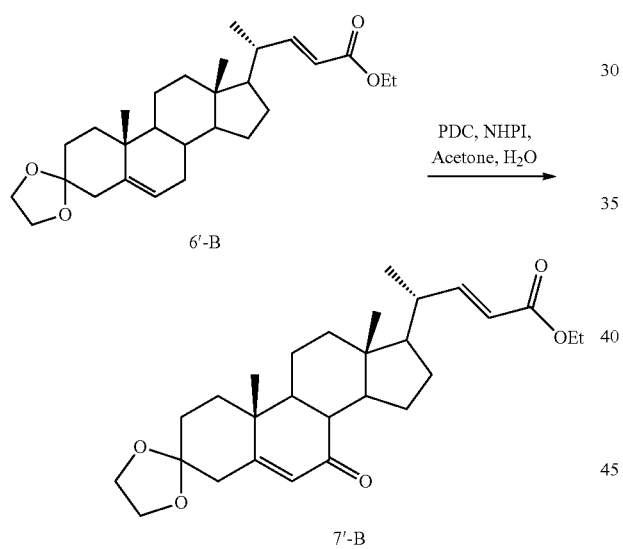

Example 9 Preparation of the Compound of Formula (7"-B)

The compound of formula (6"-B) (2.1 g, 4.21 mmol), 33.5 mL of acetone, 3.7 mL of H$_2$O, NHPI (1.38 g, 8.42 mmol) and PDC (3.17 g, 8.42 mmol) were added in sequence to a 250 mL single-necked flask and reacted at room temperature for 24 h. Post-processing: after the completion of the reaction was detected by TLC, the solvent was removed, then added with DCM (50 mL), stirred and dissolved, suction filtered with diatomite. The filter cake was washed with DCM (20 mL*3), and the filtrate was concentrated under reduced pressure, to obtain a light brown solid. The above crude product was added to ethanol (5 mL+0.05 mL TEA), slurried for 12 h at room temperature, and filtered with suction, to obtain compound 7"-B (1.5 g, light yellow solid) with a molar yield of 70%. $^1$H NMR (600 MHz, CDCl$_3$) δ 6.83 (dd, J=15.6, 9.0 Hz, 1H), 5.70 (dd, J=24.9, 8.5 Hz, 2H), 4.16 (q, J=7.1 Hz, 2H), 3.65-3.50 (m, 2H), 3.41 (q, J=11.5 Hz, 2H), 2.83 (dd, J=14.8, 3.0 Hz, 1H), 2.50-2.33 (m, 2H), 2.25 (m, 3H), 1.98 (d, J=12.9 Hz, 1H), 1.81-1.69 (m, 3H), 1.68-1.52 (m, 4H), 1.47-1.31 (m, 3H), 1.25 (m, 7H), 1.18 (s, 3H), 1.17 (d, J=12.9 Hz, 1H), 1.08 (d, J=6.6 Hz, 3H), 0.95 (d, J=11.1 Hz, 6H), 0.70 (s, 3H). $^{13}$C NMR (151 MHz, CDCl$_3$) δ 201.59, 167.05, 164.52, 154.47, 126.81, 119.12, 98.07, 70.39, 70.01, 60.15, 53.73, 49.89, 49.60, 45.37, 43.49, 39.50, 39.28, 38.54, 38.52, 34.44, 30.08, 28.42, 28.25, 26.33, 22.62, 21.13, 19.46, 17.12, 14.29, 12.28.

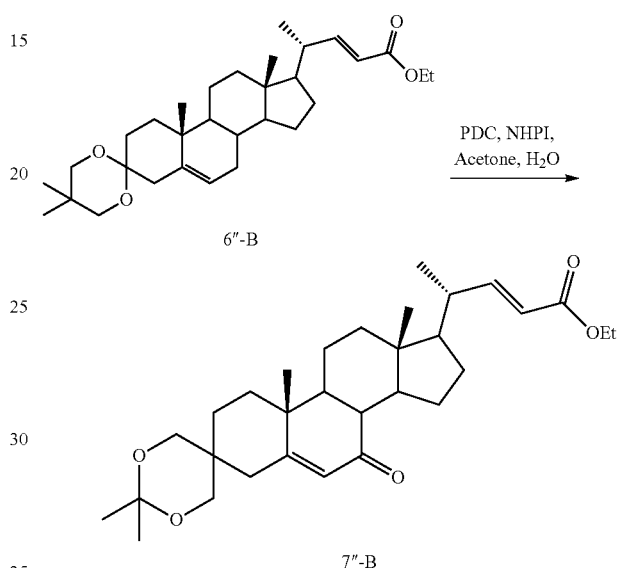

Example 10 Preparation of the Compound of Formula (8)

The compound of formula (7'-B) (4.4 g, 9.64 mmol), 45 mL of tetrahydrofuran, 5 mL of water, and 2 mL of concentrated sulfuric acid were added in sequence to a 100 mL single-necked flask, and stirred at room temperature for 4 h after the dripping was completed. After the completion of the reaction was detected by TLC, the resulting mixture was added with 80 mL of a saturated sodium bicarbonate solution to quench the reaction, extracted with ethyl acetate (30 mL*3), washed with saturated sodium chloride solution (30 mL), dried with anhydrous sodium sulfate, concentrated under reduced pressure and purified by silica gel column chromatography (PE/EA=3/1, v/v), to obtain the compound of formula (8) (3.9 g, white solid) with a molar yield of 98%.

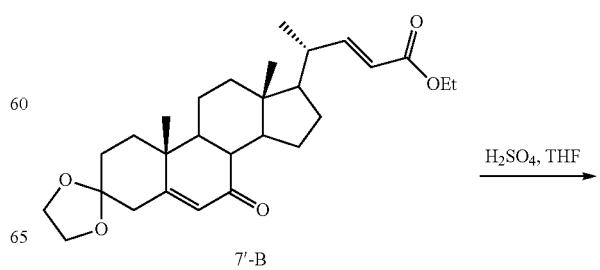

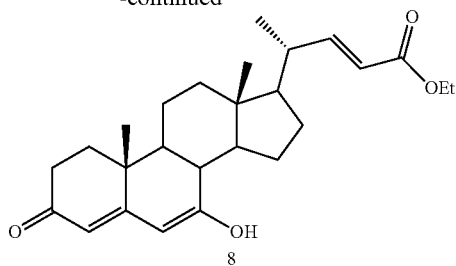

8

The compound of formula (7"-B) (5.70 g, 11.1 mmol), 51 mL of THF, and 5.8 mL of H₂O were added in sequence to a 100 mL single-necked flask, and 2.3 mL of concentrated sulfuric acid was added dropwise in an ice bath, then stirred for 12 h at room temperature after the dripping was completed. After the completion of the reaction was detected by TLC, the resulting mixture was added with 80 mL of a saturated sodium bicarbonate solution to quench, extracted with ethyl acetate (30 mL*3). The organic phases were combined, washed with saturated brine (35 mL), dried with anhydrous sodium sulfate, and concentrated under reduced pressure, to obtain a khaki solid. The solid was added to 16 mL of a mixed solution of petroleum ether and ethyl acetate (PE:EA=3:1), slurried for 12 h at room temperature, and suction filtration, to obtain compound 8 (3.7 g, white solid) with a molar yield of 81%. mp: 167-169° C. $^1$H NMR (400 MHz, DMSO-$d_6$) δ 10.22 (s, 1H), 6.74 (dd, J=15.4, 9.0 Hz, 1H), 5.78 (d, J=15.5 Hz, 1H), 5.29 (s, 1H), 5.27 (s, 1H), 4.09 (dd, J=13.2, 6.4 Hz, 2H), 2.37-2.13 (m, 5H), 1.94-1.85 (m, 2H), 1.58-1.42 (m, 4H), 1.34-1.25 (m, 3H), 1.20 (m, 6H), 1.05 (d, J=7.0 Hz, 6H), 0.69 (s, 3H). $^{13}$C NMR (100 MHz, DMSO-$d_6$) δ 198.89, 165.98, 165.30, 164.15, 154.50, 118.79, 117.65, 99.83, 59.69, 53.03, 50.42, 48.87, 44.90, 43.47, 38.80, 38.27, 35.45, 32.49, 27.95, 26.30, 25.43, 21.04, 19.19, 16.91, 14.17, 12.09. HRMS(ESI): calcd for $C_{26}H_{36}NaO_4$ [M+Na]$^+$, 435.2506, found 435.2501.

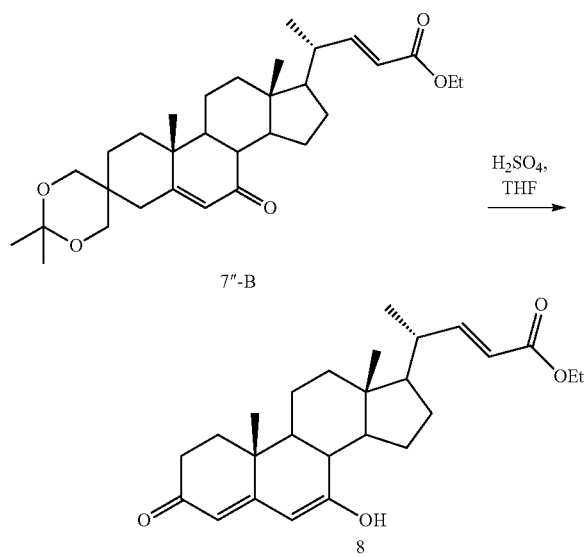

Example 11 Preparation of the Compound of Formula (9)

For the preparation of the compound of formula (9), the present invention tested various reduction and hydrolysis reaction conditions (as shown in Table 2), and obtained the optimal reduction and hydrolysis reaction conditions (as shown in Table 2, Entry 12).

TABLE 2

Reduction and hydrolysis of the compound of formula (8).[a]

| Entry | Solvent | Base | Reaction temperature (° C.) | Yield (%) |
|---|---|---|---|---|
| 1 | Isopropyl alcohol | Potassium tert-butoxide | 60 | 38 |
| 2 | n-Butanol | Potassium tert-butoxide | 60 | 35 |
| 3 | tert-Butanol | Potassium tert-butoxide | 60 | 36 |
| 4 | Tetrahydrofuran | Potassium tert-butoxide | 60 | N[c] |
| 5 | Isopropyl alcohol | Potassium tert-butoxide | 40 | 33 |
| 6 | Isopropyl alcohol | Potassium tert-butoxide | 90 | 61 |
| 7 | Isopropyl alcohol | Sodium methoxide | 90 | 44 |
| 8 | Isopropyl alcohol | Sodium ethoxide | 90 | 43 |
| 9 | Isopropyl alcohol | Sodium tert-butoxide | 90 | 72 |
| 10 | Tetrahydrofuran/ Isopropanol (1:1, v/v) | Sodium tert-butoxide | 90 | 81 |
| 11 | 1,4-dioxane/Isopropyl Alcohol (1:1, v/v) | Sodium tert-butoxide | 90 | 70 |
| 12 | 2-Methyltetrahydrofuran/ Isopropanol (1:1, v/v) | Sodium tert-butoxide | 90 | 87 |
| 13[b] | Isopropyl alcohol | Sodium tert-butoxide | 90 | 60 |
| 14[b] | Tetrahydrofuran. Isopropanol (1:1, v/v) | Sodium tert-butoxide | 90 | 65 |
| 15[b] | 2-Methyltetrahydrofuran/ Isopropanol (1:1, v/v) | Sodium tert-butoxide | 90 | 68 |

[a]All reaction times were 48 h, Raney-Ni/Compound 8 = 1:1 (m:m);
[b]Solvent and base are added together (the rest are added separately);
[c]No UDCA.

It can be seen from Table 2 that the optimal reaction conditions were obtained by screening and optimizing the solvent, base and reaction temperature, namely, the optimal reaction solvent was 2-methyltetrahydrofuran/isopropanol (1:1, v/v), the optimal base is sodium tert-butoxide, the optimal reaction temperature is 90° C., and the reaction yield reaches 87%.

Some of the examples are as follows:

The compound of formula (8) (1.0 g, 2.42 mmol), 20 mL of isopropanol, 1.0 g of Raney Ni, H₂ (4.0 MPa) were added in sequence to an autoclave and reacted for 24 hours at 90° C., then added with potassium tert-butoxide (543 mg, 4.84 mmol) and reacted for 24 hours at 90° C. After the completion of the reaction was detected by TLC, the resulting mixture was added with acetic acid to adjust the pH to 5, suction filtered with diatomite. The filtrate was concentrated under reduced pressure, dissolved in ethyl acetate (30 mL), washed with water and saturated sodium chloride solution in turn, dried with anhydrous sodium sulfate, concentrated under reduced pressure, and purified by silica gel column chromatography (DCM/MeOH=20/1, v/v), to obtain ursodeoxycholic acid (580 mg, white solid) with a molar yield of 61%.

The compound of formula (8) (1.0 g, 2.42 mmol), 20 mL of isopropanol, 1.0 g of Raney Ni, H₂ (4.0 MPa), sodium tert-butoxide (465 mg, 4.84 mmol) were added in sequence to an autoclave and reacted for 48 hours at 90° C. After the completion of the reaction was detected by TLC, the resulting mixture was added with acetic acid, adjusted the pH to 5, suction filtered with diatomite. The filtrate was concentrated under reduced pressure, dissolved in ethyl acetate (30 mL), washed with water and saturated sodium chloride solution in turn, dried with anhydrous sodium sulfate, concentrated under reduced pressure and purified by silica gel column chromatography (DCM/MeOH=20/1, v/v), to obtain ursodeoxycholic acid (571 mg, white solid) with a molar yield of 60%.

The compound of formula (8) (1.0 g, 2.42 mmol), 20 mL of isopropanol, 1.0 g of Raney Ni, $H_2$ (4.0 MPa) were added in sequence to an autoclave and reacted for 24 hours at 90° C., then added with sodium tert-butoxide (465 mg, 4.84 mmol) and reacted for 24 hours at 90° C. After the completion of the reaction was detected by TLC, the resulting mixture was added with acetic acid to adjust the pH to 5, suction filtered with diatomite. The filtrate was concentrated under reduced pressure, dissolved in ethyl acetate (30 mL), washed with water and saturated sodium chloride solution in turn, dried with anhydrous sodium sulfate, concentrated under reduced pressure and purified by silica gel column chromatography (DCM/MeOH=20/1, v/v), to obtain ursodeoxycholic acid (685 mg, white solid) with a molar yield of 72%.

The compound of formula (8) (1.0 g, 2.42 mmol), 20 mL of 2-methyltetrahydrofuran, 1.0 g of Raney Ni, $H_2$ (4.0 MPa), 20 mL of isopropanol, and sodium tert-butoxide (465 mg, 4.84 mmol), and reacted for 48 hours at 90° C. After the completion of the reaction was detected by TLC, the resulting mixture was added with acetic acid to adjust the pH to 5, suction filtered with diatomite. The filtrate was concentrated under reduced pressure, dissolved in ethyl acetate (30 mL), washed with water and saturated sodium chloride solution in turn, dried with anhydrous sodium sulfate, concentrated under reduced pressure and purified by silica gel column chromatography (DCM/MeOH=20/1, v/v), to obtain ursodeoxycholic acid (646 mg, white solid) with a molar yield of 68%.

The compound of formula (8) (1.0 g, 2.42 mmol), 20 mL of 2-methyltetrahydrofuran, 1.0 g of Raney Ni, $H_2$ (4.0 MPa) were added in sequence to an autoclave and reacted for 24 hours at 90° C., then added with 20 mL of isopropanol, sodium tert-butoxide (465 mg, 4.84 mmol) and reacted for 24 hours at 90° C. After the completion of the reaction was detected by TLC, the resulting mixture was added with acetic acid to adjust the pH to 5, suction filtered with diatomite. The filtrate was concentrated under reduced pressure, dissolved in ethyl acetate (30 mL), washed with water and saturated sodium chloride solution in turn, dried with anhydrous sodium sulfate, concentrated under reduced pressure and purified by silica gel column chromatography (DCM/MeOH=20/1, v/v), to obtain ursodeoxycholic acid (827 mg, white solid) with a molar yield of 87%.

The compound of formula (8) (1.0 g, 2.42 mmol), 20 mL of tetrahydrofuran, 1.0 g of Raney Ni, $H_2$ (4.0 MPa), 20 mL of isopropanol and sodium tert-butoxide (465 mg, 4.84 mmol) were added in sequence to an autoclave and reacted for 48 hours at 90° C. After the completion of the reaction was detected by TLC, the resulting mixture was added with acetic acid to adjust the pH to 5, suction filtered with diatomite. The filtrate was concentrated under reduced pressure, dissolved in ethyl acetate (30 mL), washed with water and saturated sodium chloride solution in turn, dried with anhydrous sodium sulfate, concentrated under reduced pressure and purified by silica gel column chromatography (DCM/MeOH=20/1, v/v), to obtain ursodeoxycholic acid (618 mg, white solid) with a molar yield of 65%.

The compound of formula (8) (2.0 g, 4.85 mmol), 20 mL of tetrahydrofuran, 2.0 g of Raney Ni, $H_2$ (4.0 MPa) were added in sequence to an autoclave and reacted for 24 hours at 90° C., then added with 20 mL of isopropanol and sodium tert-butoxide (932 mg, 9.70 mmol) and reacted for 24 hours at 90° C. After the completion of the reaction was detected by TLC, the resulting mixture was added with acetic acid to adjust the pH to 5, suction filtered with diatomite. The filtrate was concentrated under reduced pressure, dissolved in ethyl acetate (30 mL), washed with water and saturated sodium chloride solution in turn, dried with anhydrous sodium sulfate, concentrated under reduced pressure and purified by silica gel column chromatography (DCM/MeOH=20/1, v/v), to obtain ursodeoxycholic acid (1.54 g, white solid) with a molar yield of 81%. mp: 200-202° C. $^1$H NMR (400 MHz, DMSO-$d_6$) δ 11.94 (s, 1H), 4.46 (s, 1H), 3.88 (d, J=6.7 Hz, 1H), 3.35-3.24 (m, 2H), 2.26-2.19 (m, 1H), 2.13-2.05 (m, 1H), 1.95-1.81 (m, 2H), 1.78-1.63 (m, 4H), 1.51-1.42 (m, 3H), 1.41-1.28 (m, 7H), 1.23-1.08 (m, 6H), 1.05-0.91 (m, 2H), 0.88 (d, J=6.5 Hz, 6H), 0.61 (s, 3H). $^{13}$C NMR (100 MHz, DMSO-$d_6$) δ 174.93, 69.75, 69.46, 55.87, 54.70, 43.11, 43.02, 42.20, 39.94, 39.84, 39.73, 38.75, 37.75, 37.28, 34.88, 33.78, 30.78, 30.26, 28.21, 26.75, 23.34, 20.89, 18.32, 12.06. HRMS(ESI). calcd for $C_{24}H_{40}NaO_4$ [M+Na]$^+$, 415.2819, found 415.2834.

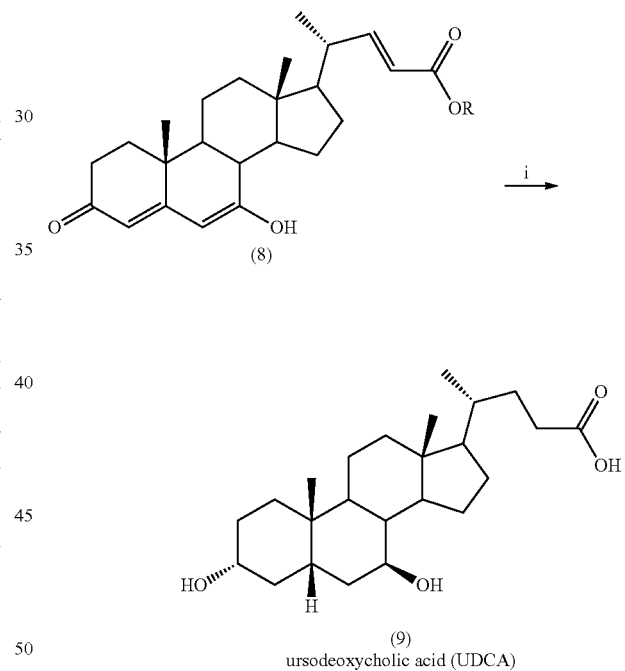

Comparative Example 1

By protecting the 3-position carbonyl group of the compound of formula (5-B), when synthesizing alkenyl ether and alkenyl ester structures (the structures are shown in formulas (10) and (11) respectively), the compounds of formula (10) and formula (11) obtained have poor stability and is easy to deteriorate; and when PDC and NHPI are used to further oxidize the compounds of formula (10) and formula (11) at the 7th position, the reaction results are complicated, and the target compound of formula (12) and formula (13) are not obtained by separation (the reaction formula is as follows).

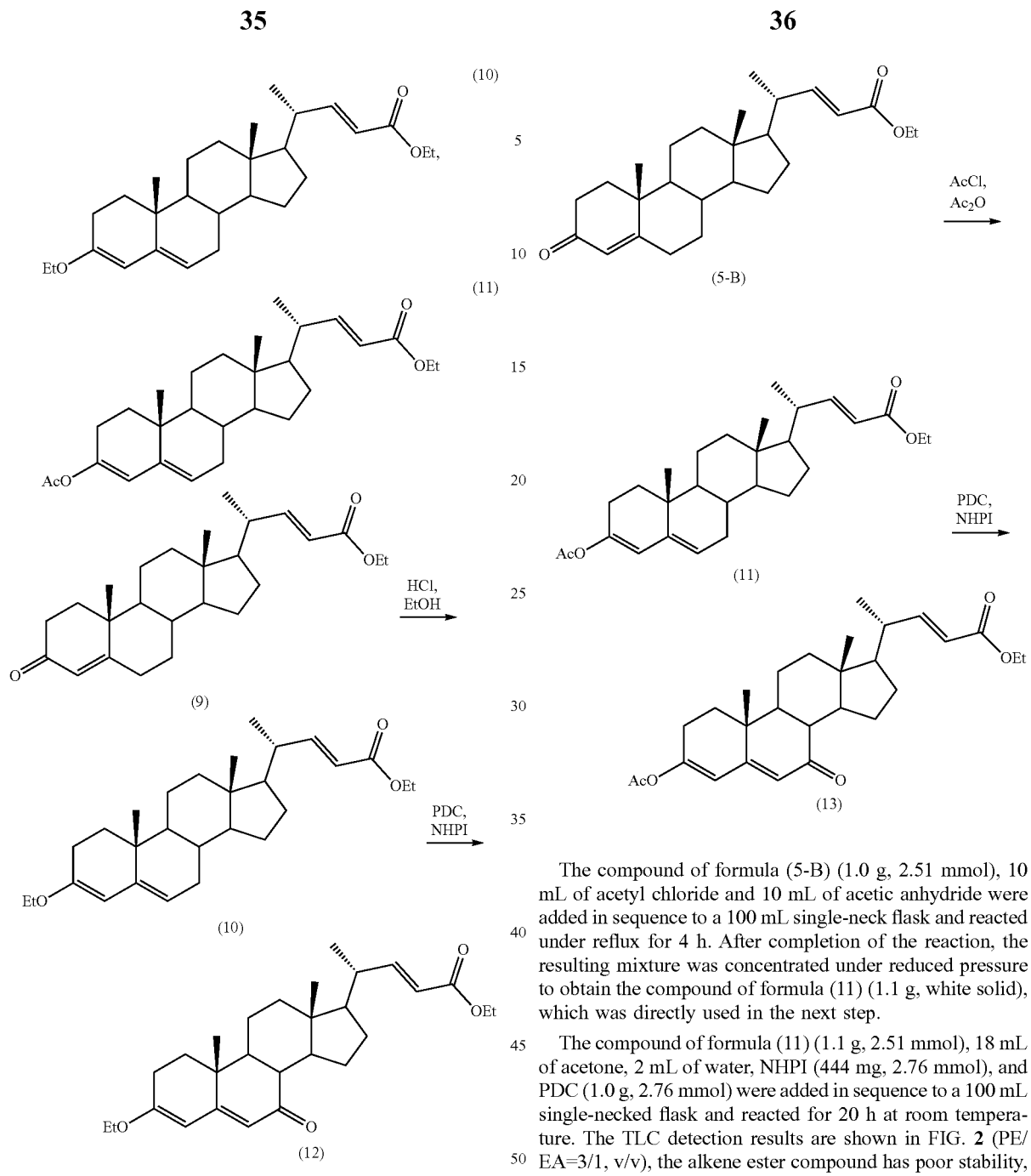

The compound of formula (5-B) (1.0 g, 2.51 mmol) and 20 mL of 1.5 M HCl/EtOH solution were added in sequence to a 100 mL single-necked flask and reacted for 4 h at room temperature. After completion of the reaction, the resulting mixture was concentrated under reduced pressure to obtain the compound of formula (10) (1.1 g, white solid), which was directly used in the next step.

The compound of formula (10) (1.1 g, 2.51 mmol), 18 mL of acetone, 2 mL of water, NHPI (444 mg, 2.76 mmol) and PDC (1.0 g, 2.76 mmol) were added in sequence to a 100 mL a single-necked flask and reacted for 20 h at room temperature. The TLC detection result is shown in FIG. 1 (PE/EA=3/1, v/v), the alkenyl ether compound has poor stability, the reaction result is complicated, and the compound of formula (12) is not obtained by isolation.

The compound of formula (5-B) (1.0 g, 2.51 mmol), 10 mL of acetyl chloride and 10 mL of acetic anhydride were added in sequence to a 100 mL single-neck flask and reacted under reflux for 4 h. After completion of the reaction, the resulting mixture was concentrated under reduced pressure to obtain the compound of formula (11) (1.1 g, white solid), which was directly used in the next step.

Figure 2:
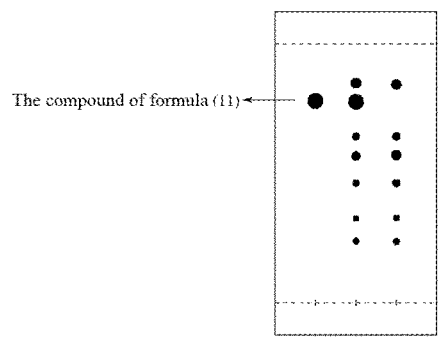
FIG. 2 shows the TLC detection results of the compound of formula (11) oxidized by PDC in Comparative Example 1.

The compound of formula (11) (1.1 g, 2.51 mmol), 18 mL of acetone, 2 mL of water, NHPI (444 mg, 2.76 mmol), and PDC (1.0 g, 2.76 mmol) were added in sequence to a 100 mL single-necked flask and reacted for 20 h at room temperature. The TLC detection results are shown in FIG. 2 (PE/EA=3/1, v/v), the alkene ester compound has poor stability, the reaction results are complicated, and the compound of formula (13) is not obtained by isolation.

From this comparative example 1, it can be seen that the compounds with alkenyl ether and alkenyl ester structures have poor stability and are easy to deteriorate. When using PDC and NHPI for 7th position oxidation, the reaction results are complicated, and the target compounds of formula (12) and formula (13) are not obtained by separation.

Comparative Example 2

When the compound (8) is reduced by Pd/C—$H_2$, $NaBH_4$, etc., the reaction result is complicated, and the target compounds of formula (14) and formula (15) are not obtained by separation (reaction formula is as follows).

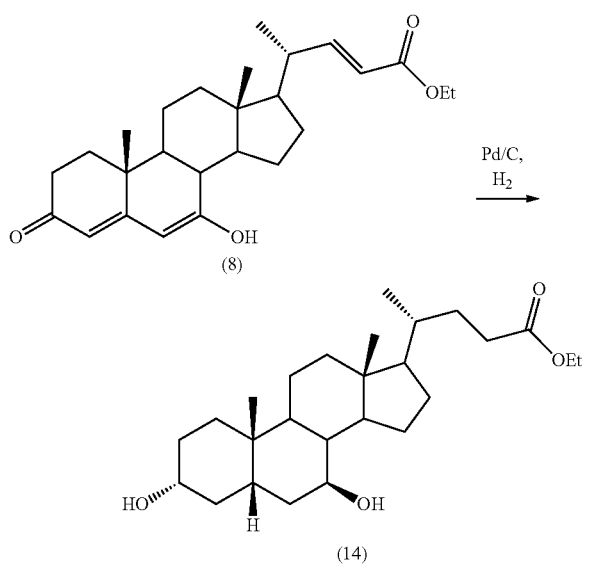

Figure 3:
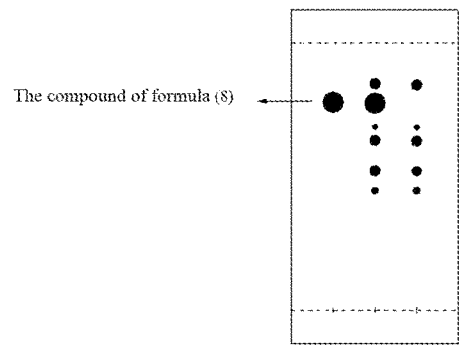
FIG. 3 shows the results of TLC detection of the compound of formula (8) reduced by Pd/C—$H_2$ in Comparative Example 2.

The compound of formula (8) (1.0 g, 2.42 mmol), 20 mL of methanol and 0.1 g of 10% Pd/C, $H_2$ (4.0 MPa) were added in sequence to an autoclave, and reacted for 24 hours at 60° C. The TLC detection results are shown in FIG. 3 (PE/EA=1/1, v/v). When Pd/C—$H_2$ is used to reduce compound (8), the reaction result is complicated, and the compound of formula (14) is not isolated.

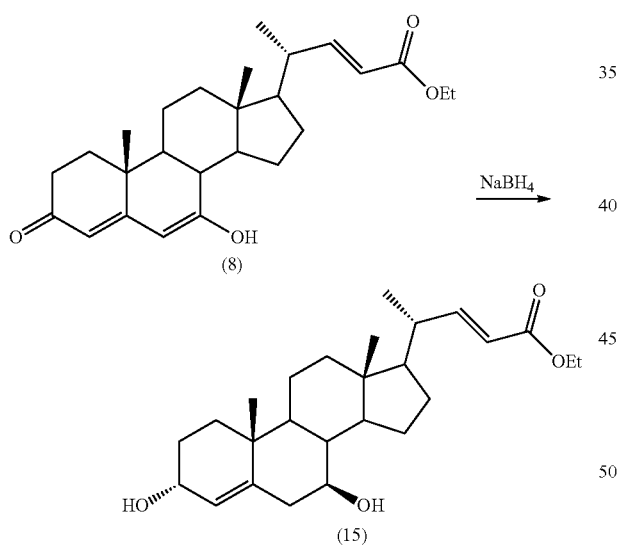

Figure 4:
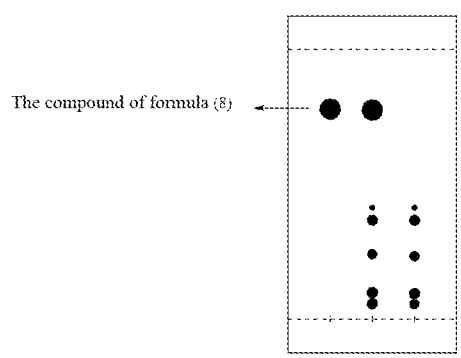
FIG. 4 shows the results of TLC detection of the compound of formula (8) reduced by $NaBH_4$ in Comparative Example 2.

The compound of formula (8) (1.0 g, 2.42 mmol), 20 mL of methanol, and $NaBH_4$ (458 mg, 12.10 mmol) were added in sequence to a 100 mL single-necked flask, stirred for 4 h at room temperature. The TLC detection results are shown in FIG. 4 (PE/EA=1/1, v/v). When compound (8) is reduced by $NaBH_4$, the reaction result is complicated, and the compound of formula (15) is not obtained by separation.

It can be seen from this comparative example 2 that when Pd/C—$H_2$, $NaBH_4$, etc. are used for reduction, the reaction result is complicated, and the target compounds of formula (14) and formula (15) are not obtained by separation.

The protection of the invention is not limited to the above embodiments. Without departing from the spirit and scope of the idea of the invention, all changes and advantages that can be thought of by a person skilled in the field are included in the present invention and the scope of protection is the appended claim.

What is claimed is:

1. A method for the synthesis of ursodeoxycholic acid by using BA as a raw material, wherein, the said method comprises the following steps:
   (a) in the first solvent, BA shown in formula (1) is protected by ethylene glycol to obtain the compound of formula (2);
   (b) in the second solvent, the compound of formula (2) is oxidized to obtain the compound of formula (3);
   (c) in the third solvent, the compound of formula (3) undergoes Wittig reaction to obtain the compound of formula (6);
   (d) in the fourth solvent, the compound of formula (6) is oxidized to obtain the compound of formula (7);
   (e) in the fifth solvent, the compound of formula (7) undergoes hydrolysis reaction under the action of acid and deprotection of ethylene glycol, to obtain the compound of formula (8);
   (f) in the sixth solvent, under the action of catalyst and hydrogen under pressure, the compound in formula (8) is heated with alkali and subjected to reduction and hydrolysis reaction, to obtain ursodeoxycholic acid shown in formula (9);

or, the said method comprises the following steps:
   (g) in the seventh solvent, BA shown in formula (1) is oxidized to obtain the compound of formula (4);
   (h) in the eighth solvent, the compound formula (4) undergoes Wittig reaction to obtain the compound formula (5);
   (i) in the ninth solvent, the compound of formula (5) is protected by ethylene glycol or neopentyl glycol to obtain the compound of formula (6);
   (d) in the fourth solvent, the compound of formula (6) is oxidized to obtain the compound of formula (7);
   (e) in the fifth solvent, the compound of formula (7) undergoes hydrolysis reaction under the action of acid and deprotection of ethylene glycol or neopentyl glycol, to obtain the compound of formula (8);
   (f) in the sixth solvent, under the action of catalyst and hydrogen under pressure, the compound of formula (8) is heated with alkali and subjected to reduction and hydrolysis reaction, to obtain the ursodeoxycholic acid as shown in formula (9);
      wherein, the reaction process of the said method is shown in the route (A):

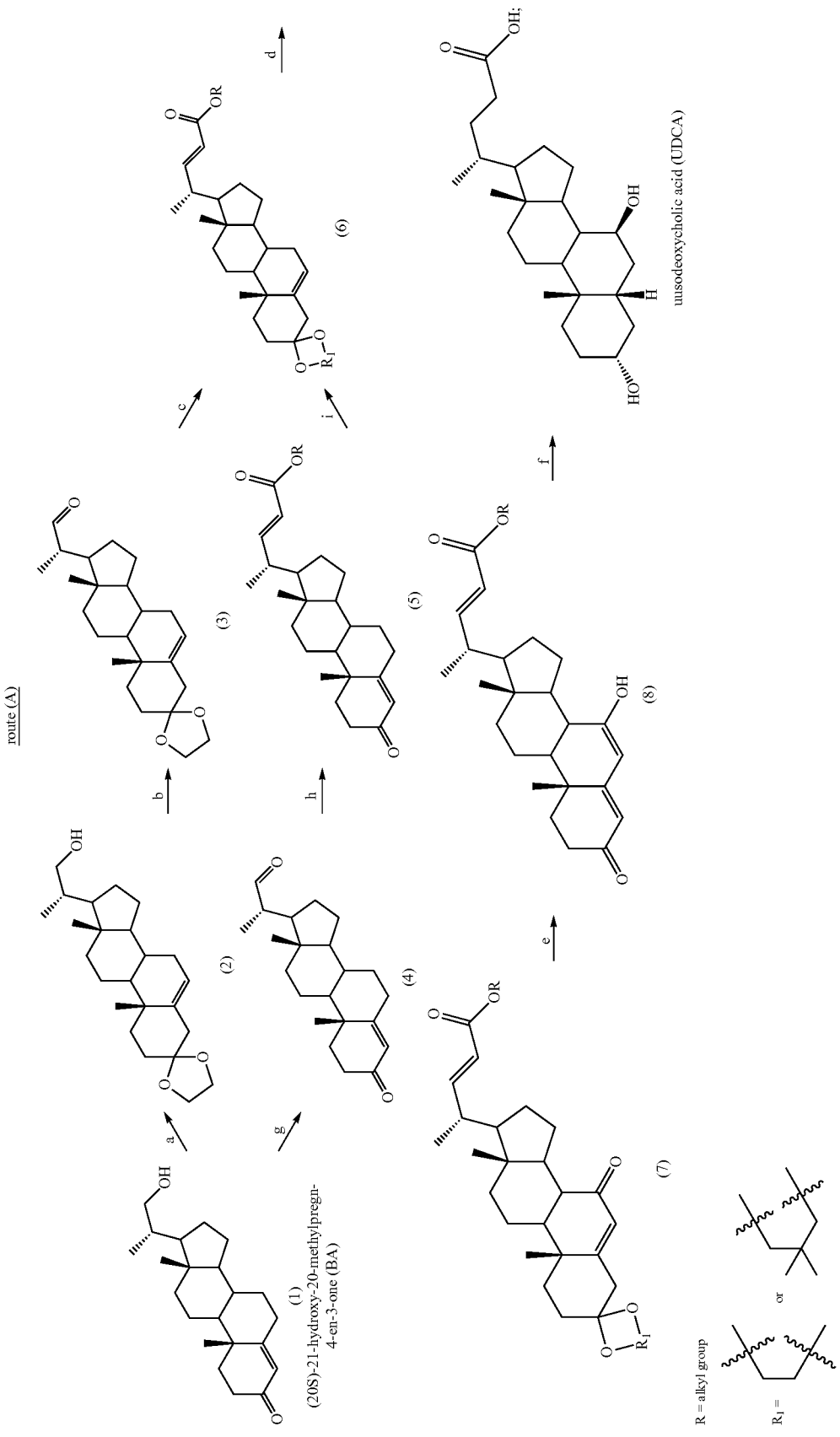

in the said route (A), R is an alkyl group; $R_1$ is

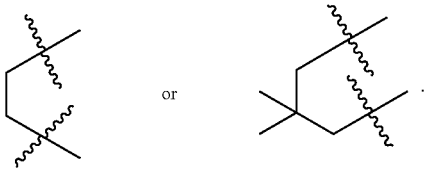

2. The method of claim 1, wherein, R is a C1-C20 alkyl group; and $R_1$ is

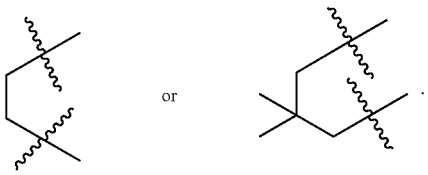

3. The method of claim 1, wherein, in step (a), the said ethylene glycol protection reaction refers to: BA shown in formula (1), ethylene glycol and p-toluenesulfonic acid are dissolved in the first solvent and subjected to ethylene glycol protection reaction, to obtain the compound of formula (2); wherein, the molar ratio of BA shown in formula (1), ethylene glycol and p-toluenesulfonic acid is 1:(1-50):(0.01-1)-1), respectively; and/or, the said first solvent is selected from one or more of benzene, toluene, ethyl acetate, tetrahydrofuran or hexane; and/or, the said ethylene glycol protection reaction temperature is 80-130° C.; and/or, the said ethylene glycol protection reaction time is 2-36 h.

4. The method of claim 1, wherein, in step (a), the said ethylene glycol protection reaction refers to: BA shown in formula (1), ethylene glycol, p-toluenesulfonic acid and triethyl orthoformate are dissolved in the first solvent and subjected to ethylene glycol protection reaction, to obtain the compound of formula (2); wherein, the molar ratio of BA shown in formula (1), ethylene glycol, p-toluenesulfonic acid and triethyl orthoformate is 1: 1-50):(0.01-1):(1-20), respectively; and/or, the said first solvent is selected from one or more of benzene, toluene, ethyl acetate, tetrahydrofuran or hexane; and/or, the said ethylene glycol protection reaction temperature is 0-50° C.; and/or, the said ethylene glycol protection reaction time is 2-36 h.

5. The method of claim 1, wherein, in step (b), the said oxidation reaction refers to: the compound of formula (2), TEMPO, sodium bicarbonate, tetrabutylammonium bromide and oxidant are dissolved in the second solvent and subjected to oxidation reaction, to obtain the compound of formula (3); wherein, the molar ratio of the compound of formula (2), TEMPO, sodium bicarbonate, tetrabutylammonium bromide and oxidant is 1:(0-1):(0-20):(0-1):(1-5), respectively; and/or, the said oxidation reaction is performed under the action of oxidant, wherein, the said oxidant is selected from one or more of N-chlorosuccinimide (NCS), N-bromosuccinimide (NBS) or 2-iodoylbenzoic acid (IBX); and/or, the said second solvent is selected from one or more of dichloromethane, tetrahydrofuran, toluene, dimethyl sulfoxide or water; and/or, the said oxidation reaction temperature is 0-30° C.; and/or, the said oxidation reaction time is 2-8 h.

6. The method of claim 1, wherein, in step (c), the said Wittig reaction refers to: the compound of formula (3) and ethyl (triphenylphosphoranylidene)acetate are dissolved in the third solvent and subjected to Wittig reaction, to obtain the compound of formula (6); wherein, the molar ratio of the compound of formula (3) and ethyl (triphenylphosphoranylidene)acetate is 1:(1-5), respectively; and/or, the said third solvent is selected from one or more of benzene, toluene, ethyl acetate, tetrahydrofuran or hexane; and/or, the said Wittig reaction temperature is 80-130° C.; and/or, the said Wittig reaction time is 2-8 h.

7. The method of claim 1, wherein, in step (c), the said Wittig reaction refers to: the compound of formula (3), sodium hydride and triethyl phosphonoacetate are dissolved in the third solvent to undergo Wittig reaction, to obtain the compound of formula (6); wherein, the molar ratio of the compound of formula (3), sodium hydride and triethyl phosphonoacetate is 1:(1-5):(1-5), respectively; and/or, the said third solvent is selected from one or more of benzene, toluene, ethyl acetate, tetrahydrofuran or hexane; and/or, the said Wittig reaction temperature is 0-30° C.; and/or, the said Wittig reaction time is 2-8 h.

8. The method of claim 1, wherein, in step (g), the said oxidation reaction refers to: BA shown in formula (1), TEMPO, sodium bicarbonate, tetrabutylammonium bromide and an oxidant are dissolved in the seventh solvent and subjected to oxidation reaction, to obtain the compound of formula (4); wherein, the molar ratio of the compound of formula (1), TEMPO, sodium bicarbonate, tetrabutylammonium bromide and the oxidant is 1:(0-1):(0-20):(0-1):(1-5), respectively; and/or, the said oxidation reaction is performed under the action of oxidant, wherein, the said oxidant is selected from one or more of N-chlorosuccinimide (NCS), N-bromosuccinimide (NBS), 2-iodoylbenzoic acid (IBX); and/or, the said seventh solvent is selected from one or more of dichloromethane, tetrahydrofuran, toluene, dimethyl sulfoxide or water; and/or, the said oxidation reaction temperature is 0-30° C.; and/or, the said oxidation reaction time is 2-8 h.

9. The method of claim 1, wherein, in step (h), the said Wittig reaction refers to: the compound of formula (4) and
methyl (triphenylphosphoranylidene)acetate or ethyl (triphenylphosphoranylidene)acetate or propyl 2-(triphenylphosphoranylidene)acetate are dissolved in the eighth solvent and subjected to Wittig reaction, to obtain the compound of formula (5); wherein, the molar ratio of the compound of formula (4),
methyl (triphenylphosphoranylidene)acetate or ethyl (triphenylphosphoranylidene)acetate or propyl 2-(triphenylphosphoranylidene)acetate is 1:(1-5), respectively; and/or, the said eighth solvent is selected from one or more of benzene, toluene, ethyl acetate, tetrahydrofuran or hexane; and/or, the said Wittig reaction temperature is 80-130° C.; and/or, the said Wittig reaction time is 2-8 h.

10. The method of claim 1, wherein, in step (h), the said Wittig reaction refers to: the compound of formula (4), sodium hydride and methyl phosphonoacetate diethyl ester or triethyl phosphonoacetate or propyl phosphonoacetate diethyl ester are dissolved in the eighth solvent and subjected to the Wittig reaction, to obtain the compound of formula (5); wherein said the eighth solvent is selected from one or more of the benzene, toluene, ethyl acetate, tetrahydrofuran or hexane; and/or, the molar ratio of the compound of formula (4), sodium hydride, methyl phosphonoacetate diethyl ester or triethyl phosphonoacetate or propyl phosphonoacetate diethyl ester is 1:(1-5):(1-5), respectively; and/or, said Wittig reaction temperature is 0-30° C.; and/or, said Wittig reaction time is 2-8 h.

11. The method of claim 1, wherein, in step (i), the said ethylene glycol or neopentyl glycol protection reaction refers to: the compound of formula (5), ethylene glycol or neopentyl glycol and p-toluenesulfonic acid are dissolved in the ninth solvent and subjected to ethylene glycol or neopentyl glycol protection reaction, to obtain the compound of formula (6); wherein, the molar ratio of the compound of formula (5), ethylene glycol or neopentyl glycol and p-toluenesulfonic acid is 1:(1-50):(0.01-1), respectively; and/or, the said ninth solvent is selected from one or more of benzene, toluene, ethyl acetate, tetrahydrofuran or hexane; and/or, the said ethylene glycol or neopentyl glycol protection reaction temperature is 80-130° C.; and/or, the said ethylene glycol or neopentyl glycol protection reaction time is 2-36 h.

12. The method of claim 1, wherein, in step (i), the said ethylene glycol or neopentyl glycol protection reaction refers to: the compound of formula (5), ethylene glycol or neopentyl glycol, p-toluenesulfonic acid and triethyl orthoformate are dissolved in the ninth solvent and subjected to ethylene glycol protection reaction, to obtain the compound of formula (6); wherein, the molar ratio of the compound of formula (5), ethylene glycol or neopentyl glycol, p-toluenesulfonic acid and triethyl orthoformate is 1:(1-50):(0.01-1): (1-20), respectively; and/or, the said ninth solvent is selected from one or more of benzene, toluene, ethyl acetate ester, tetrahydrofuran or hexane; and/or, the ethylene glycol or neopentyl glycol protection reaction temperature is 0-50° C.; and/or, the ethylene glycol or neopentyl glycol protection reaction time is 2-36 h.

13. The method of claim 1, wherein, in step (d), the said oxidation reaction refers to: the compound of formula (6), an oxidant, N-hydroxyphthalimide and acetic acid are dissolved in the fourth solvent and subjected to oxidation reaction, to obtain the compound of formula (7); wherein, the molar ratio of the compound of formula (6), the oxidant, N-hydroxyphthalimide (NHPI) and acetic acid is 1:(1-5):(1-5):(0-5), respectively; and/or, wherein, the said oxidant is selected from one or more of $Na_2Cr_2O_7$, $K_2Cr_2O_7$, PDC or BPO; and/or, the said fourth solvent is selected from one or more of toluene, acetone, acetonitrile, water, dichloromethane, N,N-dimethylformamide, ethyl acetate, tert-butanol or N-methylpyrrolidone; and/or, the said oxidation reaction temperature is 0-50° C.; and/or, the said oxidation reaction time is 10-48 h.

14. The method of claim 1, wherein, in step (e), the said ethylene glycol or neopentyl glycol deprotection reaction refers to: the compound of formula (7) and acid are dissolved in the fifth solvent and subjected to ethylene glycol or neopentyl glycol deprotection reaction, to obtain the compound of formula (8); wherein, the molar ratio of the compound of formula (7) and the acid is 1:(1-50), respectively; and/or, the said fifth solvent is selected from one or more of tetrahydrofuran, ethyl acetate, methanol, dichloromethane, ether, water, toluene or acetone; and/or, the said acid is selected from one or more of concentrated sulfuric acid, concentrated hydrochloric acid or p-toluenesulfonic acid; and/or, the said hydrolysis reaction temperature is 0-50° C.; and/or, the said hydrolysis reaction time is 1-10 h.

15. The method of claim 1, wherein, in step (f), the molar ratio of the compound of formula (8) and the base is 1:(1-5), respectively; and/or, the mass ratio of the compound of formula (8) and Raney nickel is 1:(0.1-5), respectively; and/or, the said sixth solvent is selected from one or more of tetrahydrofuran, 2-methyltetrahydrofuran, isopropanol, tert-butanol, methanol or ethanol; and/or, the said base is selected from one or more of sodium tert-butoxide, potassium tert-butoxide, sodium ethoxide, sodium methoxide, sodium hydroxide or potassium hydroxide; the said catalyst is selected from one or more of Raney nickel; and/or, the said hydrolysis and reduction reaction temperature is 20-100° C.; and/or, the said hydrolysis and reduction reaction time is 24-72 h; and/or, the said reaction is carried out under the condition of hydrogen pressurization, and the said pressure range of the hydrogen is 0.1-10 MPa.

16. Compounds have the structures shown in formula (6'), formula (6"), formula (7'), formula (7") or formula (8) respectively:

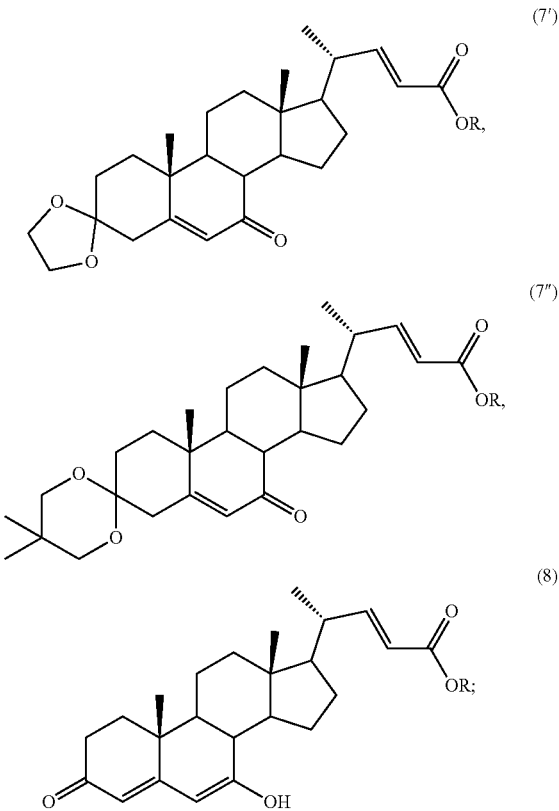

wherein R is an alkyl group.

17. The compound of claim 16, wherein R is a C1~C20 alkyl group.

* * * * *